US012433871B2

(12) United States Patent
Mammoto et al.

(10) Patent No.: US 12,433,871 B2
(45) Date of Patent: Oct. 7, 2025

(54) EFFECTS OF AGE-DEPENDENT CHANGES IN CELL SIZE ON ENDOTHELIAL CELL GROWTH

(71) Applicant: The Medical College of Wisconsin, Inc., Milwaukee, WI (US)

(72) Inventors: Akiko Mammoto, Pewaukee, WI (US); Tadamori Mammoto, Pewaukee, WI (US)

(73) Assignee: The Medical College of Wisconsin, Inc., Milwaukee, WI (US)

( * ) Notice: Subject to any disclaimer, the term of this patent is extended or adjusted under 35 U.S.C. 154(b) by 994 days.

(21) Appl. No.: 17/439,382

(22) PCT Filed: Mar. 12, 2020

(86) PCT No.: PCT/US2020/022277
§ 371 (c)(1),
(2) Date: Sep. 14, 2021

(87) PCT Pub. No.: WO2020/209972
PCT Pub. Date: Oct. 15, 2020

(65) Prior Publication Data
US 2022/0175730 A1     Jun. 9, 2022

Related U.S. Application Data

(60) Provisional application No. 62/819,055, filed on Mar. 15, 2019.

(51) Int. Cl.
*A61K 31/415*     (2006.01)
*A61K 9/06*       (2006.01)
*G01N 1/30*       (2006.01)

(52) U.S. Cl.
CPC .............. *A61K 31/415* (2013.01); *A61K 9/06* (2013.01); *G01N 1/30* (2013.01)

(58) Field of Classification Search
CPC ................................................. A61K 31/4155
See application file for complete search history.

(56) References Cited

PUBLICATIONS

Nguyen (Microcirculation vol. 24 pp. 1-13 published Jul. 2017) (Year: 2017).*
Nguyen (Microcirculation vol. 24 pp. 1-13 published 2017). (Year: 2017).*
Adnot, S., et al., "Telomere Dysfunction and Cell Senescence in Chronic Lung Diseases: Therapeutic Potential". Pharmacol Ther (2015) 153, 125-134.
Ames, J.J., et al., "Identification of an Endogenously Generated Cryptic Collagen Epitope (XL313) That May Selectively Regulate Angiogenesis by an Integrin Yes-associated Protein (YAP) Mechanotransduction Pathway" J Biol Chem (2016) 291, 2731-2750.
Ando, J., et al., "Flow detection and calcium signaling in vascular endothelial cells" Cardiovasc Res (2013) 99, 260-268.
Aragona, M., et al., "A mechanical checkpoint controls multicellular growth through YAP/TAZ regulation by actin-processing factors", Cell. 2013; 154:1047-59.
Azzolin, L., et al., "YAP/TAZ incorporation in the β-catenin destruction complex orchestrates the Wnt response". Cell. 2014; 158:157-70.
Baeyens, N., et al., "Endothelial fluid shear stress sensing in vascular health and disease" J Clin Invest (2016) 126, 821-828.
Bao, M., et al., "3D microniches reveal the importance of cell size and shape". Nat Commun. (2017) 8, 1962.
Basagiannis, D., et al., "VEGF induces signalling andangiogenesis by directing VEGFR2 internalisation through macropinocytosis". J Cell Sci (2016) 129, 4091-4104.
Biran, A., et al., "Quantitative identification of senescent cells in aging and disease" Aging Cell (2017) 16, 661-671.
Booyse, F. M., et al., "Effects of chronic oral consumption of nicotine on the rabbit aortic endothelium". Am J Pathol (1981) 102, 229-238.
Brock, A., et al., "Geometric determinants of directional cell motility revealed using microcontact printing" Langmuir (2003) 19, 1611-1617.
Calvo, F., et al., ""Mechanotransduction and YAP-dependent matrix remodelling is required for thegeneration and maintenance of cancer-associated fibroblasts"" Nat Cell Biol (2013) 15, 637-646.
Campisi, J. "Aging, cellular senescence, and cancer" Annu. Rev. Physiol. (2013) 75, 685-705.
Campisi, J., "Cellular Senescence and Lung Function during Aging Yin and Yang." Ann. Am. Thorac. Soc. (2016) 13 Suppl. 5, S402-S406.
Carmeliet, P., et al., "Molecular mechanisms and clinicalapplications of angiogenesis." Nature (2011) 473, 298-307.
Cau, J., et al., "Cdc42 controls the polarity of the actin and microtubule cytoskeletons through two distinct signal transduction pathways". J. Cell. Sci. (2006) 118, 2579-2587.
Chaker, D., et al., "Inhibition of the RhoGTPase Cdc42 by ML141 enhances hepatocyte differentiation from human adipose-derived mesenchymal stem cells via the Wnt5a/PI3K/miR-122 pathway: impact of the age of the donor". Stem Cell Research & Therapy (2018) 9:167.
Cheng, et al., "S1P stimulates proliferation by upregulating CTGF expression through S1PR2-mediated YAP activation", Mol. Cancer Res. (2018) 16(10):1543-1555.
Chen, C.S., et al., "Geometric control of cell life and death." Science (1997) 276, 1425-1428.
Chen, HY, et al., "Inhibition of redox/Fyn/c-Cbl pathway function by Cdc42 controls tumour initiation capacity and tamoxifen sensitivity in basal-like breast cancer cells" EMBO Mol Med (2013) 5, 723-736.
Choi, H.J., et al., "Yes-associated protein regulates endothelial cell contact-mediated expression of angiopoietin-2" Nat Commun (2016) 6, 6943.
Chung, A.S., et al., "Developmental and pathological angiogenesis," Annu Rev Cell Dev Biol (2011) 27, 563-584.
De Ferrari, G.V., et al., "Common genetic variation within the low-density lipoprotein receptorrelated protein 6 and late-onset Alzheimer's disease." Proc Natl Acad Sci U S A (2007) 104, 9434-9439.

(Continued)

*Primary Examiner* — George W Kosturko
(74) *Attorney, Agent, or Firm* — Quarles & Brady LLP

(57) ABSTRACT

Described herein are angiogenic stimulating compositions comprising ML141 or a derivative thereof and methods of use of said angiogenic stimulating compositions for the treatment or prevention of a disease or injury in a subject, preferably a human subject of at least 50 years of age.

18 Claims, 6 Drawing Sheets

(56) References Cited

PUBLICATIONS

Dupont, S., et al., "Role of YAP/TAZ in mechanotransduction" Nature (2011) 474, 179-183.

Elbediwy, A., et al., "Integrin signalling regulates YAP and TAZ to control skin homeostasis" Development (2016) 143, 1674-1687.

Florian, M.C., et al., "Expression and Activity of the Small RhoGTPase Cdc42 in Blood Cells of Older Adults Are Associated With Age and Cardiovascular Disease," J Gerontol A Biol Sci Med Sci (2017) 72, 1196-1200.

Fu, J., et al., "Fibulin-5 promotes airway smooth muscle cell proliferation and migration via modulating Hippo-YAP/TAZ pathway," Biochem Biophys Res Commun (2017) 493, 985-991.

Gong, Y., et al., "LDL receptor-relatedprotein 5 (LRP5) affects bone accrual and eye development," Cell (2001) 107, 513-523.

Haynes, BA, et al., "Isolation, Expansion, and Adipogenic Induction of CD34+CD31+ Endothelial Cells from Human Omental and Subcutaneous Adipose Tissue" J Vis Exp. (2018) 137.

Huynh, J., et al., "Age-related intimal stiffening enhances endothelial permeability and leukocyte transmigration," Sci Transl Med (2011) 3, 112-122.

Katsumi, A., et al., "Integrins in mechanotransduction" J Biol Chem (2004) 279, 12001-12004.

Kim, J., et al., "YAP/TAZ regulates sprouting angiogenesis and vascular barrier maturation," J Clin Invest (2017) 127, 3441-3461.

Kodaka, M., el al., "The mammalian Hippo pathway: regulation and function of YAP1 and TAZ," Cell Mol Life Sci (2015) 72, 285-306.

Kurakin, A., et al., "Dynamic self-guiding analysis of Alzheimer's disease," Oncotarget (2015) 6, 14092-14122.

Lacolley, P., et al., "Vascular Smooth Muscle Cells and Arterial Stiffening: Relevance in Development, Aging, and Disease," Physiol Rev (2017) 97, 1555-1617.

Lahteenvuo, J., et al., "Effects of aging on angiogenesis," Circ Res (2012) 110, 1252-1264.

Lee, S.H., et al., "Hypoxia inhibits cellular senescence to restore the therapeutic potential of old human endothelial progenitor cells via the hypoxia-inducible factor-1alpha-TWIST-p21 axis" Arterioscler Thromb Vasc Biol (2013) 33, 2407-2414.

Liu, F., et al., "Mechanosignaling through YAP and TAZ drives fibroblast activation and fibrosis" Am J Physiol Lung Cell Mol Physiol (2015) 308, L344-357.

Liu, Z., et al., "MAPK-Mediated YAP Activation Controls Mechanical-Tension-Induced Pulmonary Alveolar Regeneration" Cell Rep (2016) 16, 1810-1819.

Loforese, G., et al., "Impaired liver regeneration in aged mice can be rescued by silencing Hippo core kinases MST1 and MST2," EMBO Mol Med (2017) 9, 46-60.

Mammoto, A., et al., "A mechanosensitive transcriptional mechanism that controls angiogenesis" Nature (2009) 457, 1103-1108.

Mammoto, A., et al., "Role of RhoA, mDia, and ROCK in cell shape-dependent control of the Skp2-p27kip1pathway and the G1/S transition" J Biol Chem (2004) 279, 26323-26330.

Mammoto, A., et al. (2012). Mechanosensitive mechanisms in transcriptional regulation. Journal of cell science, 125 (Pt 13), 3061-3073. https://doi.org/10.1242/jcs.093005.

Mammoto A., et al. Control of lung vascular permeability and endotoxin-induced pulmonary oedema by changes in extracellular matrix mechanics. Nat Commun 4, 1759 (2013). https://doi.org/10.1038/ncomms2774.

Mammoto A., et al. (2019). LRP5 in age-related changes in vascular and alveolar morphogenesis in the lung. Aging, 11(1), 89-103. https://doi.org/10.18632/aging.101722.

Mammoto, A., et al., "Methods for studying mechanical control of angiogenesis by the cytoskeleton and extracellular matrix" Methods Enzymol (2008) 443, 227-259.

Mammoto, A., et al., "AP1-TEAD1 signaling controls angiogenesis and mitochondrial biogenesis throughPGC1α" Microvascular Research (2018) 119, 73-83.

Mammoto, T., et al., "The Role of Twist1 Phosphorylation in Angiogenesis and Pulmonary Fibrosis" Am J Respir Cell Mol (2016) Biol 55, 633-644.

Mammoto, T., et al. "Role of collagen matrix in tumor angiogenesis and glioblastoma multiforme progression." The American journal of pathology 183.4 (2013): 1293-1305.

Mammoto, T., et al. "Extracellular matrix structure and tissue stiffness control postnatal lung development through the lipoprotein receptor-related protein 5/Tie2 signaling system." American journal of respiratory cell and molecular biology 49.6 (2013): 1009-1018.

Mammoto, T., et al., "Twist1 in hypoxia-induced pulmonary hypertension through TGFβ-Smad signaling" Am J Respir Cell Mol Biol (2018) 58, 194-207.

Mani, A., et al., "LRP6 mutation in a family with early coronary disease and metabolic risk factors" Science (2007) 315, 1278-1282.

Marsh, E., et al., "Positional Stabili and Membrane Occupancy Define Skin Fibroblast Homeostasis In Vivo" Cell (2018) 175, 1620-1633 e1613.

Matsuda, et al., "Adipose-Derived Stem Cells Promote Angiogenesis and Tissue Formation for In Vivo Tissue Engineering" Tissue Engineering Part A (2013) vol. 19, No. 11-12, pp. 1327-1335.

McDonald, D.M., "Endothelial gaps and permeability of venules in rat tracheas exposed to inflammatory stimuli" Am J Physiol (1994) 266, L61-83.

Merino, M.M., et al., "Survival of the Fittest: Essential Roles of Cell Competition in Development, Aging, and Cancer" Trends Cell Biol (2016) 26, 776-788.

Miettinen, T.P., et al., "Mitochondrial Function and Cell Size: An Allometric Relationship" Trends Cell Biol (2017) 27, 393-402.

Nakajima, H., et al., "Flow-Dependent Endothelial YAP Regulation Contributes to Vessel Maintenance" Dev Cell (2017) 40, 523-536 e526.

Nardone, G., et al., "YAP regulates cell mechanics by controlling focal adhesion assembly," Nat. Commun. (2017) 8, 15321.

Nguyen, D.T., et al., "Cdc42 regulates branching in angiogenic sprouting in vitro" Microcirculation (2017) 24:e12372.

Ohgushi, M., et al., "Rho-Signaling-Directed YAP/TAZ Activity Underlies the Long-Term Survival and Expansion of Human Embryonic Stem Cells" Cell Stem Cell (2015) 17, 448-461.

Osmanagic-Myers, S., et al., "Endothelial Progerin Expression Causes Cardiovascular Pathology Through an Impaired Mechanoreponse" J Clin Invest (2019) 129:531-46.

Ota, M., et al., "Mammalian Tead proteins regulate cellproliferation and contact inhibition as transcriptional mediators of Hippo signaling," Development (2008) 135, 4059-4069.

Panciera, T., et al., "Mechanobiology of YAP and TAZ in physiology and disease" Nat Rev Mol Cell Biol. (2017) 18:758-70.

Patten, I.S., et al., "PGC-1 coactivators in the cardiovascular stem" Trends Endocrinol Metab (2012) 23, 90-97.

Piccolo, S., et al., "Molecular pathways: YAP and TAZ take center stage in organ growth and tumorigenesis" Clin Cancer Res (2013) 19, 4925-4930.

Piccolo, S., et al., "The biology of YAP/TAZ: hippo signaling and beyond" Physiol Rev (2014) 94, 1287-1312.

Pobbati, et al., "Identification of quinolinols as activators of TEAD-dependent transcription," ACS Chem. Biol. (2019) 14, 2909-2921.

Remington, J. P. (2006). Remington: the science and practice of pharmacy (vol. 1). Lippincott Williams & Wilkins.

Rivard, A., et al., "Age-dependent impairment ofangiogenesis," Circulation (1999) 99, 111-120.

Sakabe, M., et al., "YAP/TAZ-CDC42 signaling regulates vascular tip cell migration," Proc Nail Acad Sci USA (2017) 114, 10918-10923.

Sero, J.E., et al., "Paxillin mediates sensing of physical cues and regulates directional cell motility by controlling lamellipodia positioning" PLoS One (2011) 6, e28303; 1-18.

Shao, D. D., et al., "KRAS and YAP1 Converge to Regulate EMT and Tumor Survival" Cell (2014) 158:171-84.

Sokolov, I., et al., "Recovery of aging-related size increase of skin epithelial cells: in vivo mouse and in vitro human study" PLoS One (2015) 10, e0122774; 1-10.

(56) References Cited

PUBLICATIONS

Stevens, T., et al., "Lung vascular cell heterogeneity: endothelium, smooth muscle, and fibroblasts" Proc Am Thorac Soc (2008) 5, 783-791.

Sun, N., et al., "The Mitochondrial Basis of Aging," Mol. Cell (2016) 61, 654-666.

Swarbrick, James. Encyclopedia of Pharmaceutical Technology: vol. 6. CRC press, 2013.

Umbayev, B., et al., "Elevated levels of the small GTPase Cdc42 induces senescence in male rat mesenchymal stem cells" Biogerontology (2018) 19, 287-301.

Wang, K.C., et al., "Flow-dependent YAP/TAZ activitiesregulate endothelial phenotypes and atherosclerosis," Proc Nat Acad Sci USA (2016a) 113, 11525-11530.

Wang, L., et al., "Integrin-YAP/TAZ-JNK cascade mediates atheroprotective effect of unidirectional shear flow," Nature (2016b) 540, 579-582.

Welters, H. et al. "Wnt signaling: relevance to β-cell biology and diabetes." Trends in Endocrinology & metabolism 19.10 (2008): 349-355.

Xie, Q., et al., "YAP/TEAD-mediated transcription controls cellular senescence." Cancer Res. (2013) 73, 3615-3624.

Xu, M., et al., "A systematic integrated analysis of brain expression profiles reveals YAP1 and other prioritized hub genes as important upstream regulators in Alzheimer's disease." Alzheimers Dement (2018) 14, 215-229.

Yang, J., et al., "Cell size and growth rate are major determinants of replicative lifespan" Cell Cycle (2011) 10, 144-155.

Yeh, Y.C., et al., "Mechanotransduction of matrix stiffness in regulation of focal adhesion size and number: reciprocal regulation of caveolin-1 and beta1 integrin" Sci Rep (2017) 7, 15008; 1-14.

Zhang, H., et al., "Yap1 is required for endothelial to mesenchymal transition of the atrioventricular cushion." J Biol Chem (2014) 289, 18681-18692.

Zhao, B., et al., "Inactivation of YAP oncoprotein by the Hippo pathway is involved in cell contact inhibition and tissue growth control" Genes Dev (2007) 21, 2747-2761.

PCT International Search Report and Written Opinion, PCT/US2020/022277, Oct. 5, 2020, 10 pages.

\* cited by examiner

FIGS. 1A-1D
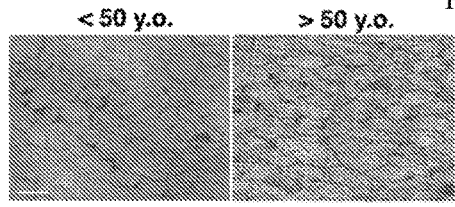
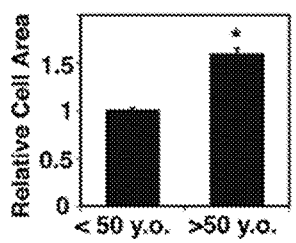
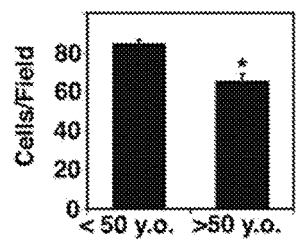
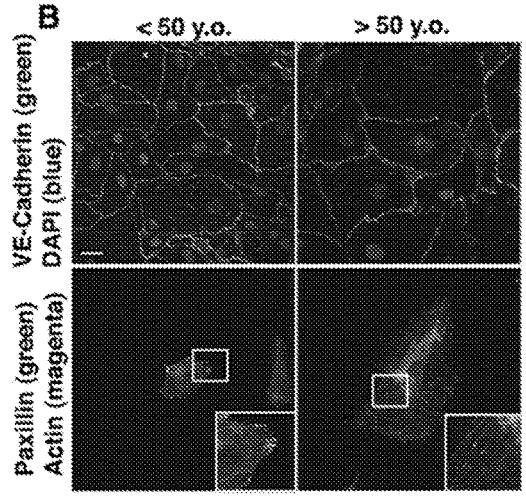
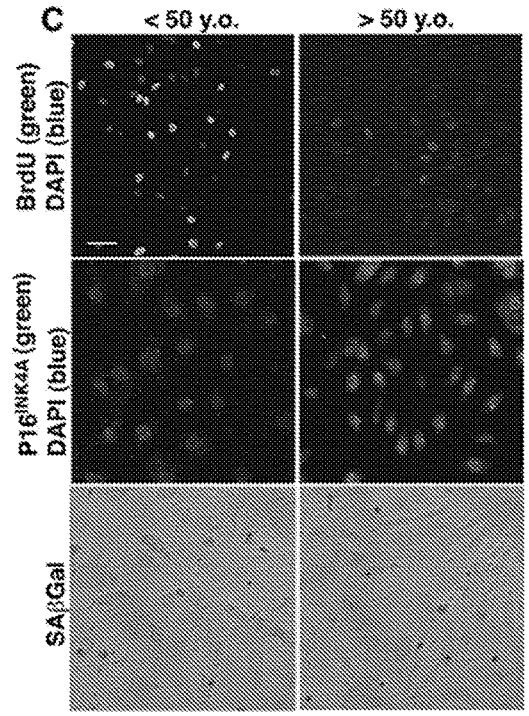
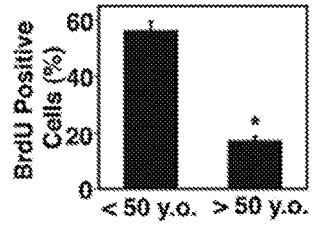
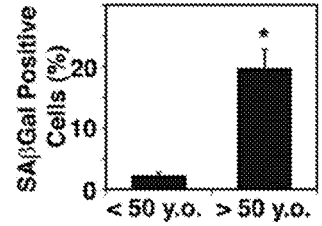
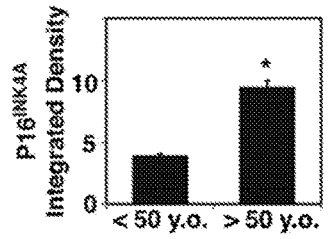
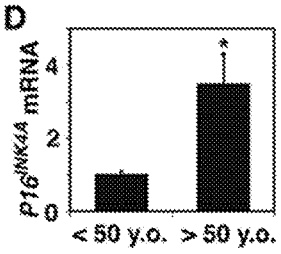

FIGS. 4A-4C
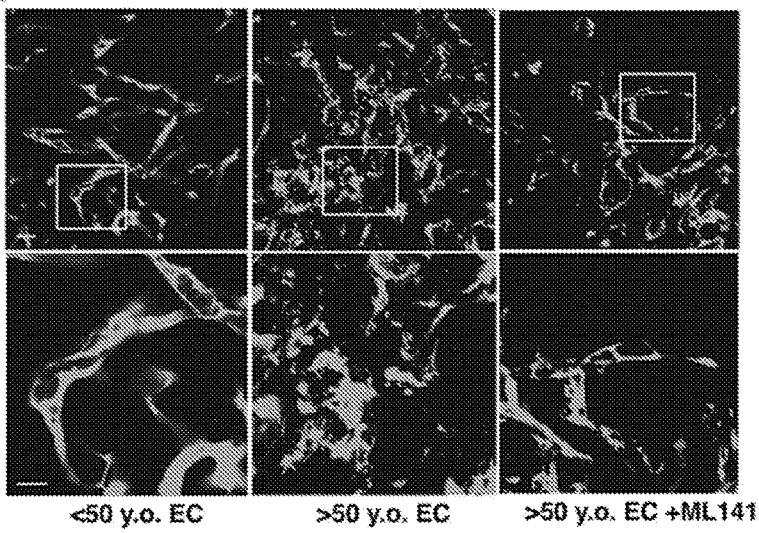
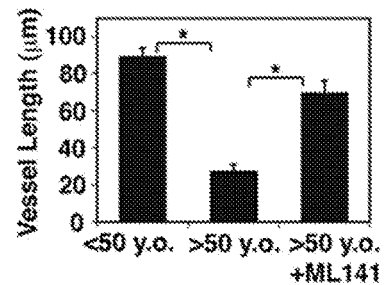
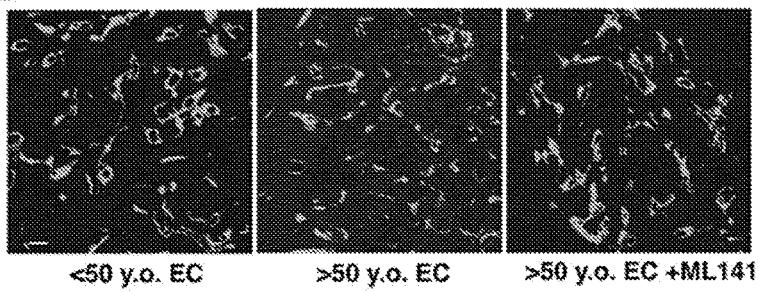
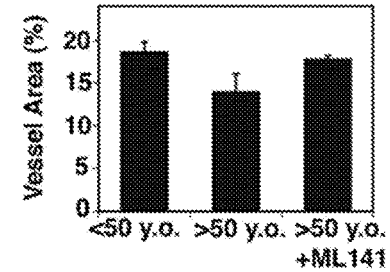
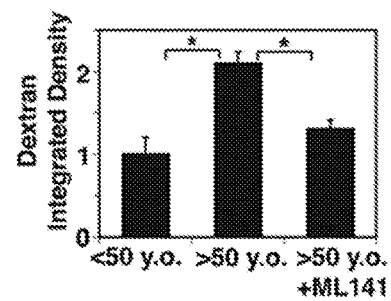
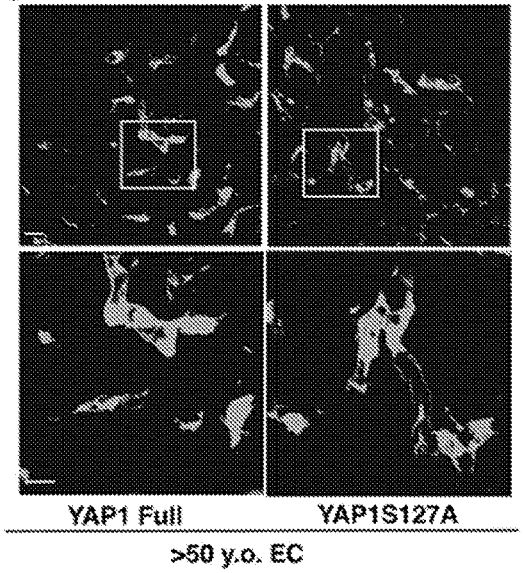
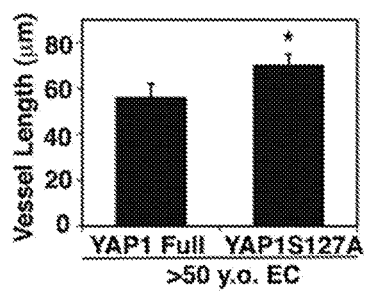
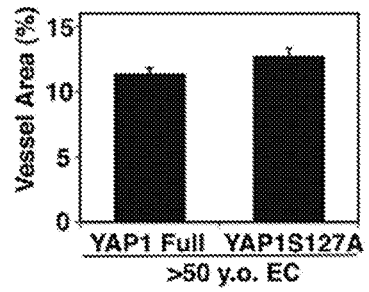

EFFECTS OF AGE-DEPENDENT CHANGES IN CELL SIZE ON ENDOTHELIAL CELL GROWTH

CROSS-REFERENCE TO RELATED APPLICATIONS

This application represents the national stage entry of PCT International Application No. PCT/US2020/022277, filed on Mar. 12, 2020 and claims priority to U.S. Provisional Application No. 62/819,055, filed Mar. 15, 2019, which is incorporated herein by reference in its entirety.

STATEMENT REGARDING FEDERALLY SPONSORED RESEARCH

This invention was made with government support under AG054830, HL139638, and HL135901 awarded by the National Institutes of Health. The government has certain rights in the invention.

REFERENCE TO A SEQUENCE LISTING SUBMITTED VIA EFS-WEB

The content of the ASCII text file of the sequence listing named "650053_00678_ST25.txt" which is 1.04 kb in size was created on Mar. 11, 2020 and electronically submitted via EFS-Web herewith the application is incorporated herein by reference in its entirety.

BACKGROUND

Angiogenesis plays important roles in organ development, regeneration and pathology [1, 2]. Angiogenic signaling (e.g., vascular endothelial growth factor (VEGF), Tie2, FGF, HIF1α) and endothelial cell (EC) proliferation are attenuated in aging animals and age-dependent decline in angiogenesis leads to the development of aging-associated diseases, including cardiovascular diseases, Alzheimer's disease, osteoporosis, diabetes, and COPD [3-5]. Although most studies of angiogenesis have focused on soluble angiogenic factors and signaling molecules, biophysical factors such as cell size and geometry, cell-cell and cellmatrix interactions, extracellular matrix (ECM) stiffness, and blood flow also play important roles in angiogenesis [6, 7]. We have reported that EC shape and size control EC proliferation [8]. Culturing ECs on substrates of different stiffness or at the different densities also changes cell size and shape, and consequently modulates angiogenic gene expression and regulates EC proliferation, behaviors, and function [9-11]. ECM stiffness [12] and blood flow [5], which change cell size and shape, are altered in aged tissues with epithelial cells and fibroblasts being generally larger than those in younger tissues [13-16]. Senescent cells [14] or highly passaged cells [13], which mimic the phenotype of aged cells, are also larger than nonsenescent or lower passaged cells. However, the direct effects of EC size on age-dependent changes in EC proliferation and suppression of angiogenesis have not been explored.

SUMMARY OF THE INVENTION

In a first aspect, described herein is a method of stimulating angiogenesis in a subject in need thereof comprising the step of administering to the subject a therapeutically effective amount of ML141 or a derivative thereof, whereby angiogenesis in the subject is stimulated. In some embodiments, the ML141 or the derivative thereof is administered by subcutaneous, intravenous, or intraperitoneal injection. In some embodiments, ML141 or the derivative thereof stimulates Yes-associated protein (YAP1) nuclear translocation. ML141 or the derivative thereof is administered at least twice or at least once daily to the subject. In other embodiments, the administration is by extended release dosage. In some embodiments, the subject in need is a subject at least 50 years of age.

In some embodiments, prior to administration of ML141 or the derivative thereof, the area of the endothelial cells of the subject is at least 1.5 times larger than the area of endothelial cells in a subject less than 50 years of age. In some embodiments, endothelial cell size is measured by a method comprising the steps of obtaining an adipose tissue sample from the subject; staining the adipose tissue with a stain specific for endothelial cells; and measuring the area of the stained endothelial cells. In some embodiments, the stain silver nitrate.

In some embodiments, prior to administration of ML141 or the derivative thereof, the endothelial cells of the subject are at least 25% less dense than endothelial cells in a subject less than 50 years of age. In some embodiments, endothelial cell density is measured by a method comprising the steps of obtaining an adipose tissue sample from the subject, staining the adipose tissue with a stain specific for endothelial cells; and measuring the density of the stained endothelial cells. In some embodiments, the stain is silver nitrate.

In some embodiments, the ML141 or the derivative thereof is administered at a concentration of between about 0.1 µM and about 1,000 µM per dose. In some embodiments, the ML141 or the derivative thereof is administered as part of a pharmaceutical composition additionally comprising a carrier such as DMSO. In some embodiments, the subject has previously been diagnosed with cardiovascular disease, Alzheimer's, osteoporosis, diabetes, age-related macular degeneration, or chronic obstructive pulmonary disease.

In a second aspect, provided herein is a method of stimulating angiogenesis in a subject comprising obtaining an adipose tissue sample from the subject; staining the adipose tissue with a stain specific for endothelial cells; measuring the area of the stained endothelial cells; and administering to the subject a therapeutically effective amount of ML141 or a derivative thereof when the area of the endothelial cells is at least 1.5 times larger than the area of endothelial cells from a subject less than 50 years of age, whereby angiogenesis is stimulated and endothelial cell area is reduced. In some embodiments, the stain is silver nitrate.

In some embodiments, the ML141 or the derivative thereof is administered by intravenous or intraperitoneal injection. In some embodiments, administration of ML141 or the derivative thereof stimulates Yes-associated protein (YAP1) nuclear translocation. In some embodiments, the ML141 or the derivative thereof is administered in at a concentration of between about 0.1 µM and about 1,000 µM per dose. In some embodiments, the ML141 or the derivative thereof is administered as part of a pharmaceutical composition additionally comprising a carrier. In some embodiment, the subject has previously been diagnosed with cardiovascular disease, Alzheimer's, osteoporosis, diabetes, age-related macular degeneration, or chronic obstructive pulmonary disease.

BRIEF DESCRIPTION OF DRAWINGS

The patent or patent application file contains at least one drawing in color. Copies of this patent or patent application publication with color drawings will be provided by the Office upon request and payment of the necessary fee.

FIGS. 1A-1D show age-dependent changes in human adipose EC size, proliferation and senescence. (FIG. 1A) Silver nitrate-stained <50 years old (<50 y.o.) and >50 years old (>50 y.o.) human adipose tissue blood vessels. Scale bar, 20 Graphs showing quantification of cell area (left) and cell density (right) in blood vessels dissecting from <50 y.o. and >50 y.o. human adipose tissues (n=27, 28, mean±s.e.m., *, p<0.05). (FIG. 1B) Immunofluorescence (IF) micrographs showing VE-cadherin-positive cell-cell junctions and DAPI (top) and paxillin-positive focal adhesions and actin stress fiber formation (bottom). Scale bar, 20 Graphs showing quantification of cell area (left) and nuclear size (right) of ECs isolated from <50 y.o. and >50 y.o. human adipose tissues (n=5, mean±s.e.m., *, p<0.05). (FIG. 1C) IF micrographs showing BrdU+ ECs isolated from <50 y.o. and >50 y.o. human adipose tissues (top). IF micrographs showing $P16^{INK4A}$-positive ECs isolated from <50 y.o. and >50 y.o. human adipose tissues (middle). Micrographs showing SAβGal-stained ECs isolated from <50 y.o. and >50 y.o. human adipose tissues (bottom). Scale bar, 20 μm. Graphs showing quantification of BrdU+, $P16^{INK4A}$+, and SAβGal-stained ECs isolated from <50 y.o. and >50 y.o. human adipose tissues (n=5, mean±s.e.m., *, p<0.05). (FIG. 1D) Graph showing $P16^{INK4A}$ mRNA levels in ECs isolated from <50 y.o. and >50 y.o. human adipose tissues (n=7, mean±s.e.m., *, p<0.05).

(FIG. 2A) Representative immunoblots showing YAP1, YAP1S127 phosphorylation and β-actin protein levels in ECs isolated from <50 y.o. and >50 y.o. human adipose tissues (top). Graphs showing the quantification of immunoblots (bottom, n=6, mean±s.e.m., *, p<0.05). (FIG. 2B) Representative immunoblots showing GTP-CDC42 and total CDC42 protein levels in ECs isolated from <50 y.o. and >50 y.o. human adipose tissues (top). Graph showing the quantification of immunoblots (bottom, n=6, mean±s.e.m., *, p<0.05). (FIG. 2C) IF micrographs showing the levels of GTP-CDC42 in ECs isolated from <50 y.o. or >50 y.o. human adipose tissues (top). Graph showing quantification of the GTP-CDC42 levels in ECs isolated from <50 y.o. and >50 y.o. human adipose tissues (n=5, mean±s.e.m., *, p<0.05). (FIG. 2D) IF micrographs showing YAP1 nuclear localization (green), actin (magenta), and DAPI (blue, top), GTP-CDC42 levels (green), actin (magenta) and DAPI (blue, middle), and $P16^{INK4A}$ (green) and DAPI (blue, bottom) in ECs isolated from <50 y.o. or >50 y.o. human adipose tissues cultured on FN-coated island of different sizes. Scale bar, 10 Graphs showing quantification of nuclear YAP1 (left top), GTP-CDC42 integrated density (left bottom), and $P16^{INK4A}$ integrated density (right top) (n=7, mean±s.e.m., *, p<0.05). (FIG. 2E) Graph showing quantification of EdU-positive cells (n=7, mean±s.e.m., *, p<0.05).

(FIG. 3A) Representative immunoblots showing YAP1, YAP1S127 phosphorylation, and β-actin protein levels in ECs isolated from >50 y.o. human adipose tissues treated with retrovirus overexpressing full-length YAP1 or YAP1S127A (left). Graph showing the quantification of immunoblots (right, n=3, *, p<0.05). (FIG. 3B) IF micrographs showing $P16^{INK4A}$ expression and DAPI in ECs isolated from >50 y.o. human adipose tissues treated with retrovirus overexpressing full-length YAP1 or YAP1S127A, cultured on FN-coated island of different sizes. Scale bar, 10 (FIG. 3C) Graph showing quantification of $P16^{INK4A}$ integrated density (n=7, mean±s.e.m., *, p<0.05). (FIG. 3D) IF micrographs showing the GTP-CDC42 levels and DAPI in ECs isolated from >50 y.o. human adipose tissues treated with ML141 (500 nM). Scale bar, 10 μm. Graph showing quantification of GTP-CDC42 integrated density (n=7, mean±s.e.m., *, p<0.05). (FIG. 3E) Representative immunoblots showing YAP1, YAP1S127 phosphorylation, and β-actin protein levels in ECs isolated from >50 y.o. human adipose tissues treated with ML-141 (top). Graph showing the quantification of immunoblots (bottom, n=3, *, p<0.05). (FIG. 3F) IF micrographs showing $P16^{INK4A}$ expression (green) and DAPI (blue, top) and YAP1 localization (green), actin structure (magenta), and DAPI (blue, bottom) in ECs isolated from >50 y.o. human adipose tissues treated with ML141 and cultured on FN-coated island of different sizes. Scale bar, Graphs showing quantification of $P16^{INK4A}$ integrated density (bottom left) and nuclear YAP1 (bottom right) (n=7, mean±s.e.m., *, p<0.05).

FIGS. 4A-4C show CDC42-YAP1 signaling mediates age-dependent decline in blood vessel formation in subcutaneously implanted gel. (FIG. 4A) IF micrographs showing vascular structures formed in the subcutaneously implanted fibrin gel supplemented with GFP-labeled ECs isolated from <50 y.o. or >50 y.o. human adipose tissues or in combination with treatment with ML141 (500 nM). Scale bar, 10 Graphs showing quantification of vessel length (top) and vessel area (bottom) in the gel (n=7, mean±s.e.m., *, p<0.05). (FIG. 4B) IF micrographs showing low MW fluorescently labeled dextran leakage (magenta) and GFP-labeled blood vessel formation (green) in the subcutaneously implanted fibrin gel supplemented with GFP-labeled ECs isolated from <50 y.o. or >50 y.o. human adipose tissues or in combination with treatment with ML141 (500 nM). Scale bar, 10 Graph showing quantification of fluorescently labeled dextran leakage in the gel (n=7, mean±s.e.m., *, p<0.05). (FIG. 4C) IF micrographs showing vascular structures formed in the subcutaneously implanted fibrin gel supplemented with GFP-labeled ECs isolated from >50 y.o. human adipose tissues in combination with treatment with retrovirus overexpressing full-length YAP1 or YAP1S127A mutant construct. Scale bar, 10 Graphs showing quantification of vessel length (top) and vessel area (bottom) in the gel (n=7, mean±s.e.m., *, p<0.05).

(FIG. 5A) Silver nitrate-stained 2M and 24M old mouse PA (top) and descending aorta (bottom). Scale bar, 20 Graphs showing quantification of cell area and density in PA (top) and descending aorta (bottom) dissecting from 2M and 24M old mice (n=7, mean±s.e.m., *, p<0.05). (FIG. 5B) Phase contrast images of cultured ECs isolated from 2M vs. 24M old mouse lungs (top, scale bar, 100 μm). IF micrographs showing paxillin-positive focal adhesions (green) and actin stress fiber formation (magenta, bottom). Scale bar, 20 Graph showing quantification of cell area of ECs isolated from 2M and 24M old mouse lungs (n=7, mean±s.e.m., *, p<0.05). (FIG. 5C) IF micrographs showing BrdU+(top), $P16^{INK4A+}$ (middle), and SAβGal-stained (bottom) ECs isolated from 2M vs. 24M old mouse lungs. Graphs showing quantification of BrdU+(top), $P16^{INK4A+}$ (middle), and SAβGal-stained (bottom) ECs isolated from 2M vs. 24M old mouse lungs (n=7, mean±s.e.m., *, p<0.05). Scale bar, 20 (FIG. 5D) IF micrograph showing the 2nd Ab alone (green) and DAPI (blue) staining. Scale bar, 20 (FIG. 5E) Graph showing $P16^{Ink4a}$ mRNA levels in ECs isolated from 2M vs. 24M old mouse lungs (n=5, mean±s.e.m., *, p<0.05). (FIG. 5F) Representative immunoblots showing P16$^{INK4A}$ and β-actin protein levels in ECs isolated from 2M vs. 24M old mouse lungs (top). Graph showing the quantification of immunoblots (bottom, n=3, mean±s.e.m., *, p<0.05).

(FIG. 6A) Representative immunoblots showing YAP1 and β-actin protein levels in ECs isolated from 2M vs. 24M old mouse lungs (top). Graph showing the quantification of immunoblots (bottom, n=3, *, p<0.05). (FIG. 6B) Graphs showing YAP1 mRNA levels in ECs isolated from <50 y.o. vs. >50 y.o. human adipose tissues (top) and 2M vs. 24M old mouse lungs (bottom, n=5, mean±s.e.m., *, p<0.05). (FIG. 6C) IF micrographs showing YAP1 localization (top) and DAPI (bottom) in ECs isolated from <50 y.o. and >50 y.o. human adipose tissues. Scale bar, 20 Graph showing quantification of nuclear YAP1 in ECs isolated from <50 y.o. and >50 y.o. human adipose tissues (n=7, mean±s.e.m., *, p<0.05). (FIG. 6D) IF micrographs showing YAP1 localization (green) and actin structure (magenta) in ECs isolated from 2M vs. 24M old mouse lungs and cultured on FN-coated island of different sizes. Scale bar, 10 (FIG. 6E) Graph showing quantification of nuclear YAP1 (n=7, mean±s.e.m., *, p<0.05). (FIG. 6F) IF micrographs showing P16$^{INK4A}$ expression (green) and DAPI (blue) in ECs isolated from <50 y.o. human adipose tissues overexpressing full-length YAP1 or YAP1S94A, cultured on FN-coated island of different sizes. Scale bar, 10 (FIG. 6G) Graph showing quantification of P16$^{INK4A}$ integrated density in ECs isolated from <50 y.o. human adipose tissues overexpressing full-length YAP1 or YAP1S94A, cultured on FN-coated island of different sizes (n=7, mean±s.e.m., *, p<0.05). (FIG. 6H) Graph showing quantification of EdU-positive ECs isolated from <50 y.o. human adipose tissues overexpressing full-length YAP1 or YAP1S94A, cultured on FN-coated island of different sizes (n=7, mean±s.e.m., *, p<0.05).

INCORPORATION BY REFERENCE

Figures 2A, 2B, 2C, 2D, 2E:
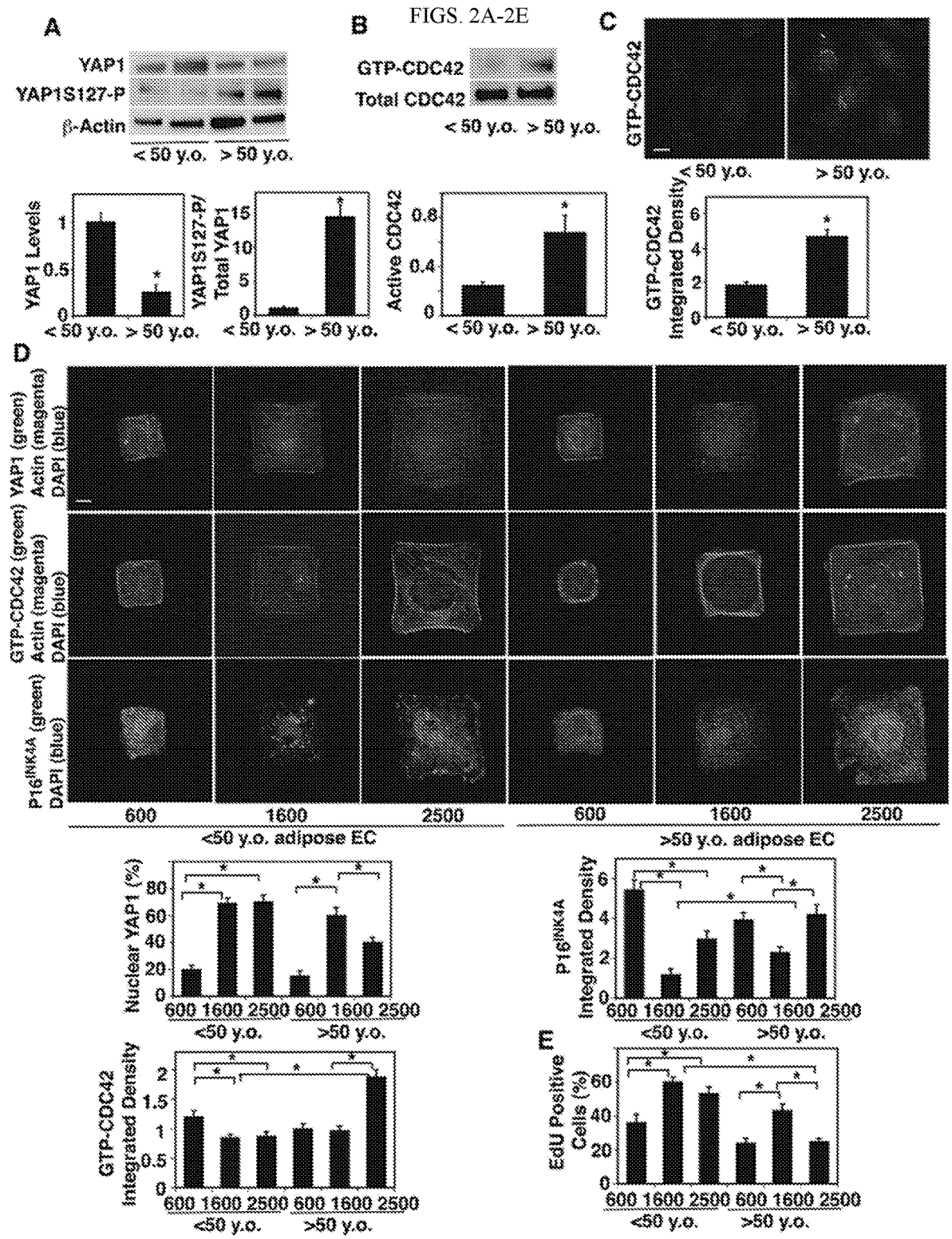
FIGS. 2A-2E show age-dependent changes in YAP1 and CDC42 activity in human adipose ECs.

All publications, patents, and patent applications mentioned in this specification are herein incorporated by reference to the same extent as if each individual publication, patent, and patent application was specifically and individually indicated to be incorporated by reference.

DETAILED DESCRIPTION OF THE DISCLOSURE

Described herein are methods for stimulating angiogenesis in aging populations using angiogenic stimulating compositions. The methods described herein include administration of an angiogenic stimulating composition to a subject in need thereof to stimulate angiogenesis. A subject in need thereof may be at least 50 years of age or may be previously diagnoses with cardiovascular disease, Alzheimer's, osteoporosis, diabetes, age-related macular degeneration, chronic obstructive pulmonary disease (COPD), or pulmonary fibrosis.

As used herein "aged population" or "aged subject" are used interchangeably and refer to human subject(s) at least 50 years of age.

As used herein "young population" or "young subject" are used interchangeably and refers to human subject(s) less than 50 years of age.

A subject in need to treatment may also be a subject whose endothelial cells have an area at least 1.5 times larger than endothelial cells of a subject less than 50 years old. A subject in need of treatment may also be a subject whose endothelial cells have a density at least 25% less than the density of endothelial cells of a subject less than 50 year of age. Endothelial cell area and density may be measured by any suitable means known in the art. In some embodiments, endothelial cells from adipose tissue are measured.

The angiogenic stimulating compositions described herein include a selective inhibitor of CDC42. Suitable CDC42 inhibitors include ML141 or a derivative thereof. The angiogenic stimulating composition may also include an endothelial cell (EC) population. In some embodiments, the angiogenic stimulating composition includes both an inhibitor of CDC42 and an EC population.

In some embodiments, the angiogenic stimulating compositions may include a YAP1 stimulator. Suitable YAP1 stimulators are known in the art and include, but are not limited to, quinolinols (see Pobbati et al., "Identification of quinolinols as activators of TEAD-dependent transcription," ACS Chem. Biol., 2019, 14, 2909-2921) and sphingosine-1phosphate (S1P) (see Cheng et al., "S1P stimulates proliferation by upregulating CTGF expression through S1PR2-mediated YAP activation," Mol. Cancer Res., 2018, 16(10): 1543-1555). In some embodiments, the angiogenic composition includes both ML141 and a YAP1 stimulator.

ML141 is a compound having the following structure:

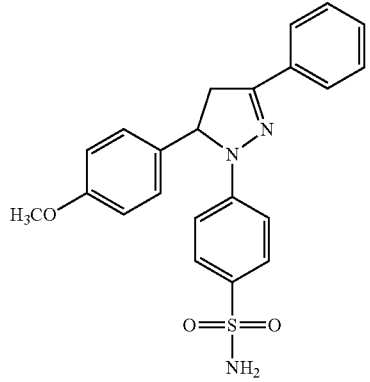 [SMILES: COc1ccc(C2CC(c3ccccc3)=NN2c2ccc(S(N)(=O)=O)cc2)cc1]

As used herein "derivative thereof," refers to a modified ML141 compound that has the same or similar or greater CDC42 inhibition properties, but has been chemically altered, such as by substitution, replacement, removal, or alteration of various functional groups, to improve one or more characteristics such as bioavailability, pharmacokinetic properties, solubility, permeability, metabolic stability, metabolic properties and binding. ML141 and derivatives thereof are available commercially.

The angiogenic stimulating composition may include a pharmaceutically acceptable carrier. By "pharmaceutically acceptable carrier" we mean any and all solvents, dispersion media, coatings, antibacterial and antifungal agents, isotonic and absorption delaying agents, and the like that are physiologically compatible. In one embodiment, the carrier may be suitable for parenteral administration.

Alternatively, the carrier can be suitable for intravenous, intraperitoneal, intramuscular, sublingual or oral administration. Pharmaceutically acceptable carriers include sterile aqueous solutions or dispersions and sterile powders for the extemporaneous preparation of sterile injectable solutions or dispersion. The use of such media and agents for pharmaceutically active substances is well known in the art. Except insofar as any conventional media or agent is incompatible with the active compound, use thereof in the pharmaceutical compositions of the invention is contemplated. Supplementary active compounds can also be incorporated into the compositions.

In some embodiments, the pharmaceutically acceptable carrier is gel. In some embodiments, the gel is a fibrin gel, Matrigel™, or a collagen gel.

Treatment

According to the methods of the present disclosure, an angiogenic stimulating composition is administered to a subject in need thereof. Subjects in need of treatment include those already having or diagnosed with a disease or injury as described herein or those who are at risk of developing a disease or injury as described herein.

A disease or injury of the present disclosure includes any disease or injury in which angiogenesis is desired. For example, stimulation of angiogenesis may be desired in, but is not limited to, cardiovascular disease, Alzheimer's disease, osteoporosis, diabetes, age-related macular degeneration, Chronic Obstructive Pulmonary Disease (COPD), and pulmonary fibrosis.

As used herein, the terms "treat" and "treating" refers to therapeutic measures, wherein the object is to slow down (lessen) an undesired physiological change or pathological disorder resulting from a disease or injury as described herein. For purposes of this invention, treating the disease or injury or stimulating angiogenesis includes, without limitation, alleviating one or more clinical indications, reducing the severity of one or more clinical indications of the disease or injury, diminishing the extent of the condition, stabilizing the subject's disease or injury (i.e., not worsening), delay or slowing, halting, or reversing the disease or injury and bringing about partial or complete remission of the disease or injury. Treating the disease or injury also includes prolonging survival by days, weeks, months, or years as compared to prognosis if treated according to standard medical practice not incorporating treatment with an angiogenic stimulating composition as described herein.

Subjects in need of treatment can include those already having or diagnosed with a disease or injury as described herein as well as those prone to, likely to develop, or suspected of having a disease or injury as described herein. Pre-treating or preventing a disease or injury according to a method of the present invention includes initiating the administration of a therapeutic (e.g., an angiogenic stimulating composition as described herein) at a time prior to the appearance or existence of the disease or injury, or prior to the exposure of a subject to factors known to induce the disease or injury. Pre-treating the disorder is particularly applicable to subjects at risk of having or acquiring the disease injury. As used herein, the terms "prevent" and "preventing" refer to prophylactic or preventive measures intended to inhibit undesirable physiological changes or the development of a disorder or condition resulting in the disease or injury. In exemplary embodiments, preventing the disease or injury comprises initiating the administration of a therapeutic (e.g., an angiogenic stimulating composition as described herein) at a time prior to the appearance or existence of the disease or injury such that the disease or injury, or its symptoms, pathological features, consequences, or adverse effects do not occur. In such cases, a method of the invention for preventing the disease or injury comprises administering an angiogenic stimulating composition as described herein to a subject in need thereof prior to exposure of the subject to factors that influence the development of the disease or injury. In some embodiments, the subject is an aged human subject at least 50 years in age and administration of an angiogenic stimulating composition as described herein prevents, delays, or lessens the severity of a disease or injury as described herein.

As used herein, the terms "subject" or "patient" are used interchangeably and can encompass any vertebrate including, without limitation, humans, mammals, reptiles, amphibians, and fish. However, advantageously, the subject or patient is a mammal such as a human, or a mammal such as a domesticated mammal, e.g., dog, cat, horse, and the like, or livestock, e.g., cow, sheep, pig, and the like. In some embodiments, the subject is a horse. In some embodiments, the subject is a human. As used herein, the phrase "in need thereof" indicates the state of the subject, wherein therapeutic or preventative measures are desirable. Such a state can include, but is not limited to, subjects having a disease or injury as described herein or a pathological symptom or feature associated with a disease or injury as described herein. An angiogenic stimulating composition as described herein and incorporating ECs can be autologous, xenogeneic, syngeneic, allogeneic, or third party with respect to the subject or patient being treated.

In some embodiments, the subject to be treated is an aged human subject of at least 50 years of age.

In some embodiments, the area of endothelial cells of the subject to be treated is at least 1.5 times larger than the area of endothelial cells from a subject less than 50 years. The endothelial cells measured may be isolated from adipose tissue from the subject. In some embodiments, endothelial cell size is measured by a method including the steps of obtaining adipose tissue from the subject, staining the adipose tissue with a stain specific for endothelial cells (e.g., silver nitrate), and measuring the area of the stained endothelial cells.

In some embodiments, the density of endothelial cells of the subject to be treated are at least 25% less dense than endothelial cells from a subject less than 50 years of age. The endothelial cells measured may be isolated from adipose tissue from the subject. In some embodiments, endothelial cell density is measured by a method including the steps of obtaining adipose tissue from the subject, staining the adipose tissue with a stain specific for endothelial cells (e.g., silver nitrate), and measuring density of the stained endothelial cells.

In some embodiments, the subject to be treated has previously been diagnosed with cardiovascular disease, Alzheimer's disease, osteoporosis, diabetes, age-related macular degeneration, COPD, or pulmonary fibrosis and administration of the angiogenic stimulating compositions stimulates angiogenesis in the subject.

In some cases, a method of treating or preventing a disease or injury as described herein comprises administering a pharmaceutical composition comprising a therapeutically effective amount of an angiogenic stimulating composition as described herein as a therapeutic agent (i.e., for therapeutic applications). As used herein, the term "pharmaceutical composition" refers to a chemical or biological composition suitable for administration to a mammal. Examples of compositions appropriate for such therapeutic applications include preparations for oral, topical, parenteral, subcutaneous, transdermal, intradermal, intramuscular, intraperitoneal, intraocular, intravenous (e.g., injectable), intraparenchymal, intrathecal, or intraarterial administration. In some cases, pharmaceutical compositions appropriate for therapeutic applications may be in admixture with one or more pharmaceutically acceptable excipients, diluents, or carriers such as sterile water, physiological saline, glucose or the like. For example, an angiogenic stimulating composition as described herein can be administered to a subject as a pharmaceutical composition comprising a carrier solution.

Formulations may be designed or intended for oral, rectal, nasal, topical or transmucosal (including buccal, sublingual, ocular, vaginal and rectal) and parenteral (including subcutaneous, intramuscular, intravenous, intradermal, intraperitoneal, intrathecal, intraocular intraparenchymal, intrathecal and epidural) administration. In some embodiments, the formulation may be a sterile suspension, emulsion, or aerosol. In general, aqueous and non-aqueous liquid or cream formulations are delivered by a parenteral, oral or topical route. In other embodiments, the compositions may be present as an aqueous or a non-aqueous liquid formulation or a solid formulation suitable for administration by any route, e.g., oral, topical, buccal, sublingual, parenteral, aerosol, a depot such as a subcutaneous depot or an intraperitoneal, intraparenchymal or intramuscular depot. In some cases, pharmaceutical compositions are lyophilized. In other cases, pharmaceutical compositions as provided herein contain auxiliary substances such as wetting or emulsifying agents, pH buffering agents, gelling or viscosity enhancing additives, preservatives, flavoring agents, colors, and the like, depending upon the route of administration and the preparation desired. The pharmaceutical compositions may be formulated according to conventional pharmaceutical practice (see, e.g., Remington: *The Science and Practice of Pharmacy*, 20th edition, 2000, ed. A. R. Gennaro, Lippincott Williams & Wilkins, Philadelphia, and *Encyclopedia of Pharmaceutical Technology*, eds. J. Swarbrick and J. C. Boylan, 1988-1999, Marcel Dekker, New York).

Therapeutic compositions typically must be sterile and stable under the conditions of manufacture and storage. The composition can be formulated as a solution, microemulsion, liposome, membrane nanoparticle or other ordered structure suitable to high drug concentration. The carrier can be a solvent or dispersion medium containing, for example, water, ethanol, polyol (for example, glycerol, propylene glycol, and liquid polyethylene glycol, and the like), and suitable mixtures thereof. The proper fluidity can be maintained, for example, by the use of a coating such as lecithin, by the maintenance of the required particle size in the case of dispersion and by the use of surfactants. In many cases, it will be preferable to include isotonic agents, for example, sugars, polyalcohols such as mannitol, sorbitol, or sodium chloride in the composition. Prolonged absorption of the injectable compositions can be brought about by including in the composition an agent which delays absorption, such as, monostearate salts and gelatin.

The preferred route may vary with, for example, the subject's pathological condition or weight or the subject's response to therapy or that is appropriate to the circumstances. The formulations can also be administered by two or more routes, where the delivery methods are essentially simultaneous or they may be essentially sequential with little or no temporal overlap in the times at which the composition is administered to the subject.

Suitable regimes for initial administration and further doses or for sequential administrations also are variable, may include an initial administration followed by subsequent administrations, but nonetheless, may be ascertained by the skilled artisan from this disclosure, the documents cited herein, and the knowledge in the art.

In some cases, an angiogenic stimulating composition as described herein may be optionally administered in combination with one or more additional active agents. Such active agents include anti-inflammatory, anti-cytokine, analgesic, antipyretic, antibiotic, and antiviral agents, as well as growth factors and agonists, antagonists, and modulators of immunoregulatory agents (e.g., TNF-$\alpha$, IL-2, IL-4, IL-6, IL-10, IL-12, IL-13, IL-18, IFN-$\alpha$, IFN-$\gamma$, BAFF, CXCL13, IP-10, VEGF, EPO, EGF, HRG, Hepatocyte Growth Factor (HGF), Hepcidin, including antibodies reactive against any of the foregoing, and antibodies reactive against any of their receptors. In some embodiments, an angiogenic stimulating composition as described herein may be administered in combination with a population of endothelial cells. Any suitable combination of such active agents is also contemplated. When administered in combination with one or more active agents, an angiogenic stimulating composition as described herein can be administered either simultaneously or sequentially with other active agents.

In some embodiments, an angiogenic stimulating composition as described herein is administered to a subject simultaneously undergoing surgery. In such cases, an angiogenic stimulating composition as described herein can be provided to a subject in need thereof in a pharmaceutical composition adapted for direct administration to the surgical site. Administration may be provided before, after, or simultaneous with surgery. An angiogenic stimulating composition as described herein can be administered directly to the surgical site. An angiogenic stimulating composition as described herein may be applied via a collagen sponge or gel, hydrogel, tissue engineered scaffold, or extracellular matrix composition. Administration as part of a cell sheet or sheath is also envisioned.

In some embodiments, an angiogenic stimulating composition as described herein is administered to a subject in need thereof using an infusion, topical application, surgical transplantation, or implantation. In an exemplary embodiment, administration is systemic. In such cases, an angiogenic stimulating composition as described herein can be provided to a subject in need thereof in a pharmaceutical composition adapted for intravenous administration to subjects. Typically, compositions for intravenous administration are solutions in sterile isotonic aqueous buffer. The use of such buffers and diluents is well known in the art. Where necessary, the composition may also include a local anesthetic to ameliorate any pain at the site of the injection. Generally, the ingredients are supplied either separately or mixed together in unit dosage form, for example, as a cryopreserved concentrate in a hermetically sealed container such as an ampoule indicating the quantity of active agent. Where the composition is to be administered by infusion, it can be dispensed with an infusion bottle containing sterile pharmaceutical grade water or saline. Where the composition is administered by injection, an ampoule of sterile water for injection or saline can be provided so that the ingredients may be mixed prior to administration. In some cases, compositions comprising an angiogenic stimulating composition as described herein are cryopreserved prior to administration. In some cases, compositions comprising an angiogenic stimulating composition as described herein are lyophilized and resuspended prior to administration.

Therapeutically effective amounts of an angiogenic stimulating composition as described herein are administered to a subject in need thereof. An effective dose or amount is an amount sufficient to effect a beneficial or desired clinical result. With regard to methods of the present invention, the effective dose or amount, which can be administered in one or more administrations, is the amount of an angiogenic stimulating composition as described herein sufficient to elicit a therapeutic effect in a subject to whom the extract is administered. In some cases, an effective dose of ML141 in the angiogenic stimulating composition is between about 0.1 µM and about 1,000 µM (e.g., 0.1 µM, 0.5 µM, 1 µM, 5 µM, 10 µM, 12 µM, 15 µM, 20 µM, 25 µM, 30 µM, 40 µM, 50 µM, 75 µM, 100 µM, 150 µM, 200 µM, 400 µM, 600 µM, 800 µM, 900 µM, 950 µM, or 1,000 µM). Effective amounts will be affected by various factors that modify the action of the extract upon administration and the subject's biological response to the extract, e.g., severity of lameness, type of tissue damage, the subject's age, sex, and diet, the severity of inflammation, time of administration, and other clinical factors.

Therapeutically effective amounts for administration to a human subject can be determined in animal tests and any art-accepted methods for scaling an amount determined to be effective for an animal for human administration. For example, an amount can be initially measured to be effective in an animal model (e.g., to achieve a beneficial or desired clinical result). The amount obtained from the animal model can be used in formulating an effective amount for humans by using conversion factors known in the art. The effective amount obtained in one animal model can also be converted for another animal by using suitable conversion factors such as, for example, body surface area factors.

It is to be understood that, for any particular subject, specific dosage regimes should be adjusted over time according to the individual need and the professional judgment of the person administering or supervising the administration of the an angiogenic stimulating composition as described herein.

In some cases, therapeutically effective amounts of an angiogenic stimulating composition as described herein can be determined by, for example, measuring the effects of a therapeutic in a subject by incrementally increasing the dosage until the desired symptomatic relief level is achieved. A continuing or repeated dose regimen can also be used to achieve or maintain the desired result. Any other techniques known in the art can be used as well in determining the effective amount range. Of course, the specific effective amount will vary with such factors as the particular disease state being treated, the physical condition of the subject, the type of animal being treated, the duration of the treatment, route of administration, and the nature of any concurrent therapy.

Following administration of an angiogenic stimulating composition as described herein to an individual subject afflicted by, prone to, or likely to develop a disease or injury described herein, a clinical symptom or feature associated with the disease or injury is observed and assessed for a positive or negative change. For example, increase in EC proliferation in a subject, decrease in EC senescence, increase in YAP1 expression, decrease in YAP1 phosphorylation, or a decrease in CDC42 activity may indicate an increase in angiogenesis in the subject.

In some embodiments, administration of the angiogenic stimulating composition as described herein results in stimulation of Yes-associated protein (YAP1) nuclear translocation.

Unless defined otherwise, all technical and scientific terms used herein have the same meaning as commonly understood by one of ordinary skill in the art to which the invention pertains. All definitions, as defined and used herein, should be understood to control over dictionary definitions, definitions in documents incorporated by reference, and/or ordinary meanings of the defined terms.

All references, patents and patent applications disclosed herein are incorporated by reference with respect to the subject matter for which each is cited, which in some cases may encompass the entirety of the document.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein, the terms "approximately" or "about" in reference to a number are generally taken to include numbers that fall within a range of 5% in either direction (greater than or less than) the number unless otherwise stated or otherwise evident from the context (except where such number would exceed 100% of a possible value). Where ranges are stated, the endpoints are included within the range unless otherwise stated or otherwise evident from the context.

The present invention has been described in terms of one or more preferred embodiments, and it should be appreciated that many equivalents, alternatives, variations, and modifications, aside from those expressly stated, are possible and within the scope of the invention.

EXAMPLES

A Hippo signaling transducer, Yes-associated protein (YAP1) acts as a transcriptional co-activator and controls organ size and regeneration (e.g., liver, heart, intestine, muscle, lung) [17, 18]. YAP1 stimulates angiogenesis and vascular function through various signaling pathways, including angiopoietin2 (Ang2), microfibrillar-associated protein 5, matrix metalloproteinase 2 (MMP2), VE-cadherin, and peroxisome proliferator-activated receptor gamma, coactivator 1 alpha (PGC1α) [19-23]. YAP1 is a mechanosensitive gene, and EC size and geometry control YAP1 activity [18, 24, 25]. Other mechanical forces such as rigidity and topology of the ECM [24, 26, 27] and shear stress [18, 21, 28, 29] that consequently alter cell shape and size also control the activity of YAP1. However, the physiological relevance of the direct effects of changes in EC size on YAP1 activity and the underlying mechanism remain unclear. Knockdown of YAP1 induces cellular senescence [30] and suppresses angiogenesis and organ regeneration (e.g., liver) in aged adults [31]. Deregulation of YAP1 signaling also contributes to aging-associated diseases such as COPD [32], pulmonary fibrosis [18, 33], and Alzheimer's disease [34, 35]. Rho-GTPase CDC42 senses mechanical forces, induces filopodia formation and regulates cellular adhesions and polarity in various types of cells including ECs and fibroblasts [36, 37]. CDC42 controls angiogenesis by changing multiple morphogenetic processes of EC sprouting [38, 39]. It has been known that CDC42 activity is higher in aged tissues [40-42] and that CDC42 controls YAP1 activity, and vice versa during retinal vascular development [20, 22] and lung epithelial regeneration [43].

The embodiments described in this example demonstrate that aged ECs are larger than young ECs. Older ECs exhibit higher CDC42 activity and lower YAP1 activity compared to younger ECs. Reduction of aged EC size using the microcontact printing system decreases CDC42 activity, stimulates YAP1 nuclear translocation, inhibits EC senescence, and reverses EC proliferation. Modulation of CDC42 and YAP1 activity restores angiogenesis in aged tissue and could be a promising therapeutic strategy for aging-associated diseases.

Results

Aged mouse and human ECs are larger than young ECs—ECM stiffness [12] and blood flow [5], which are altered in aged tissues, change EC size and shape. However, the direct effects of aging on EC size in blood vessels have not been explored. We dissected small blood vessels with a length of circumference of 300 µm (a diameter of approximately 50 µm) from human adipose tissues of various ages (Table 1) and measured EC size in blood vessels by staining with silver nitrate [44, 45], which stains cell-cell junctions, ex vivo. The areas of ECs of small blood vessels in adipose tissues of age older than 50 years old (>50 y.o.) were 1.6-times larger than those from younger adults (<50 y.o.) (FIG. 1A). In contrast, EC density was 25% lower in the aged adipose tissue blood vessels (FIG. 1A). Isolated aged human adipose ECs cultured on fibronectin (FN)-coated tissue culture dishes were also larger (2.6-fold) compared to young ECs when analyzed using VE-cadherin staining (FIG. 1B). The size of nuclei was also 1.4-times larger in cultured aged human adipose ECs compared to young ECs (FIG. 1B). There was no significant difference in the actin stress fiber structures (e.g. thickness, numbers) in young vs. old ECs (FIG. 1B), however, a major focal adhesion protein, paxillin, which was specifically localized in the punctate form at the distal ends of actin stress fibers in young adipose ECs, was distributed along the actin fibers in the cytoplasm in aged ECs (FIG. 1B). Consistent with others' reports [46, 47], EC proliferation measured by BrdU nuclear incorporation was lower by 69% in ECs isolated from aged human adipose tissue, while cellular senescence detected by $P16^{INK4A}$ immunocytochemical (ICC) analysis and SA-β galactosidase (Gal) staining increased in aged human adipose ECs; the intensity of $P16^{INK4A}$ and SA-βGal-positive cells increased by 2.2- and 10.7-times in aged vs. younger human ECs (FIG. 1C). The mRNA levels of $P16^{INK4A}$ detected by qRT-PCR were also 3.5-times higher in aged human ECs (FIG. 1D).

TABLE 1

Sample demographics

| Sample demographics (n = 55) | Young (<50 y.o., n = 27) | Old (>50 y.o., n = 28) |
|---|---|---|
| Gender, Male/Female | 11 (40%)/16 (60%) | 13 (46%)/15 (54%) |
| Age, year (mean ± s.e.m) | 38.55 ± 1.26 | 62.07 ± 1.77 |
| Body mass index (mean ± s.e.m) | 33.31 ± 2.00 | 30.00 ± 1.32 |
| Underlying diseases | | |
| Coronary artery disease | 2 (7%) | 7 (25%) |
| Hypertension | 4 (15%) | 14 (50%) |
| Hyperlipidemia | 1 (4%) | 10 (36%) |
| Diabetes mellitus | 3 (11%) | 7 (25%) |
| Atrial fibrillation | 0 | 4 (14%) |
| Myocardial infarction | 0 | 0 |
| None of the above | 6 (22%) | 6 (21%) |

Figures 5A, 5B, 5C, 5D, 5E, 5F:
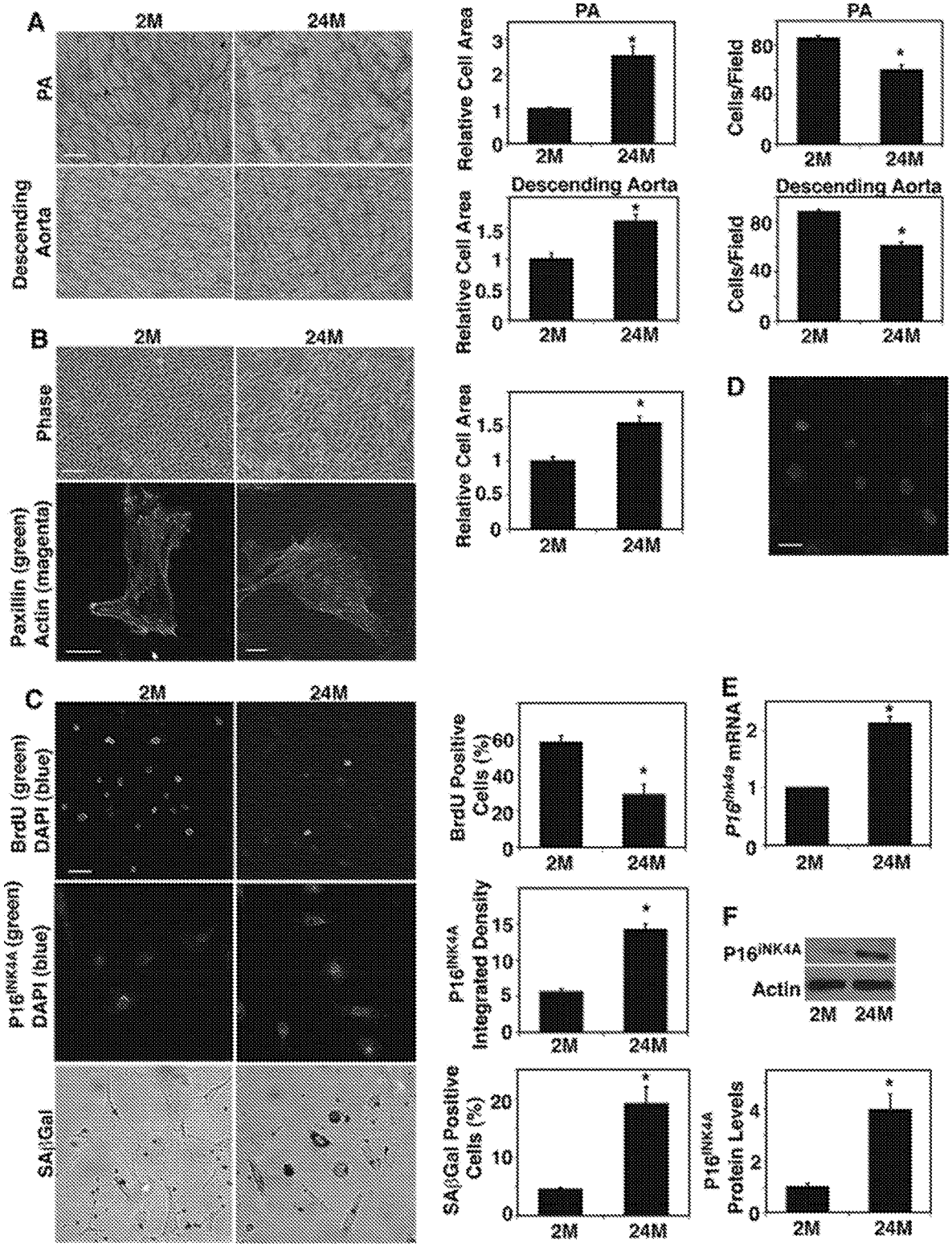
FIGS. 5A-5F show age-dependent changes in mouse EC size, proliferation and senescence.

It is known that microenvironment surrounding ECs and gene expression patterns are different among capillaries, large blood vessels and pulmonary circulation. Therefore, we examined the size of the ECs from different origins ex vivo: large blood vessels from mouse descending aorta and pulmonary blood vessels from mouse pulmonary artery (PA). When we dissected mouse PA (diameter 100 µm) from 2 months (2M) vs. 24M old mouse lungs and measured EC size using silver nitrate staining [44, 45], 24M old mouse PA ECs were 2.3-times larger than those in 2M old mice ex vivo (FIG. 5A), while EC density was 29% lower in the aged PA (FIG. 5A). Similar trends were observed in descending aorta; 24M old mouse aortic EC size was 1.6-times larger, while EC density was 29% lower compared to those in 2M old mouse aortic ECs (FIG. 5A). Isolated 24M old mouse lung ECs, which include capillary ECs, cultured on FN-coated tissue culture dishes were also 1.4-times larger compared to 2M old mouse lung ECs (FIG. 5B). Paxillin was also distributed more along the actin fibers in the cytoplasm in 24M old mouse lung ECs (FIG. 5B). Consistent with human adipose tissue-derived ECs (FIG. 1), EC proliferation measured by BrdU nuclear incorporation was inhibited by 54%, while cellular senescence detected by $P16^{INK4A}$ ICC analysis and SA-β Gal staining was 2.6- and 3.8-times higher, respectively, in 24M old mouse lung ECs (FIG. 5C). The mRNA and protein levels of $P16^{INK4A}$ also increased by 2.2- and 3.9-times, respectively, in aged mouse lung ECs (FIGS. 5E and 5F). These results suggest that aging increases EC size, alters cytoskeleton structures, and induces cellular senescence in both mouse and human ECs.

Figures 6A, 6B, 6C, 6D, 6E, 6F, 6G, 6H:
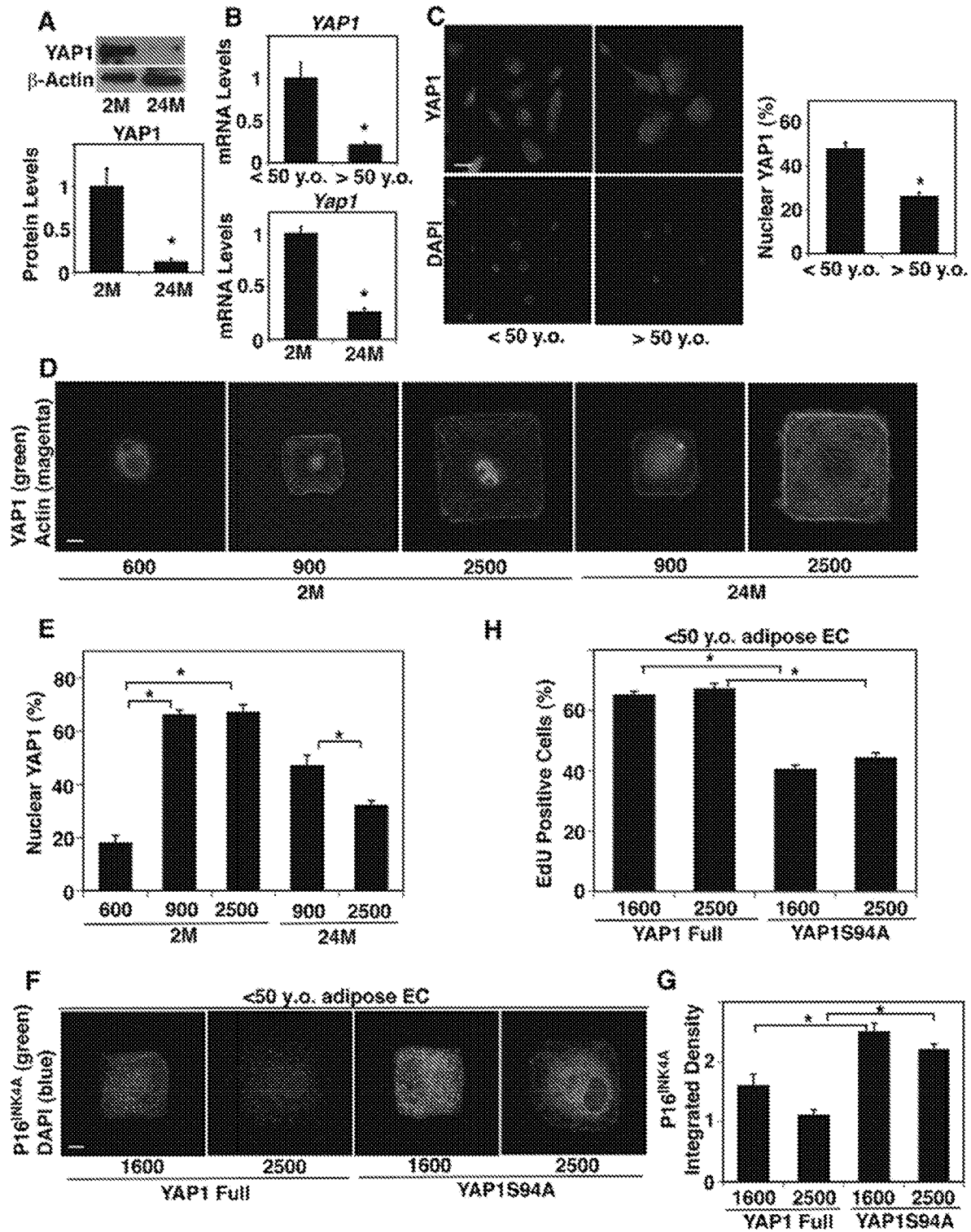
FIGS. 6A-6H show cell size-dependent changes in YAP1 activity in mouse lung ECs.

CDC42-YAP1 signaling mediates the effects of aged cell size on EC proliferation and senescence—It has been known that YAP1 senses cell size and controls cell proliferation [18, 24, 26, 27, 29]. Given that EC size increases during aging (FIG. 1, FIG. 5), we next examined whether YAP1 mediates the effects of age-dependent increases in cell size on EC proliferation and senescence. The mRNA and protein levels of YAP1 were 81% and 79% lower, respectively, in aged human adipose ECs and 78% and 91% lower, respectively, in mouse lung ECs compared to young ECs (FIG. 2A, FIGS. 6A and 6B). Phosphorylation of YAP1 at the serine127 (S127) residue by large tumor suppressor (LATS) sequesters YAP1 to the cytoplasm and has a potent role in suppressing YAP1 activity and subsequently decreases gene expression that controls cell proliferation [29, 48]. YAP1S127 phosphorylation was 14.4-times higher, and YAP1 was excluded from the nucleus and inactive in old human adipose ECs compared to young ECs (FIG. 2A, FIG. 6C).

CDC42 controls YAP1 activity and regulates alveolar epithelial stem cell proliferation in stretching cells in vitro and in the mouse lung after pneumonectomy (PNX) in vivo, in which mechanical forces are dramatically altered [43]. It has been reported that CDC42 activity is higher in aged tissues [40-42]. Therefore, we next examined the effects of aging on CDC42 activity in ECs. Consistent with others' reports [40-42], CDC42 activity measured by PAK pull-down assay increased by 3.1-times in aged human adipose ECs compared to younger human adipose ECs (FIG. 2B). ICC analysis confirmed the results; intensity of GTP-CDC42 was 2.3-times higher in aged human adipose ECs compared to young human adipose ECs (FIG. 2C).

To directly analyze whether EC size controls YAP1 activity, we prepared microcontact-printed substrates consisting of square FN-coated islands (600-2500 µm2) surrounded by non-adhesive regions, in which we directly stamped FN (50 µg/ml) onto activated polydimethylsiloxane-coated cover slips and blocked unstamped areas with Pluronic F-127 [49, 50]. When we cultured young human adipose ECs on FN-coated printed islands of different sizes [49, 50], YAP1 was localized in the nucleus (active form) on the islands of medium size (1600 µm2) or larger islands (2500 µm2), while YAP1 was in the cytosol and inactive when cultured on the smaller islands (600 µm2) (FIG. 2D). In contrast, when we cultured aged human adipose ECs on the large islands (2500 µm2), YAP1 was excluded from the nucleus, while YAP1 was in the nucleus on the medium size islands (1600 µm2) (FIG. 2D), suggesting that EC size controls YAP1 nuclear localization in a distinct way depending on the EC age. Similar trends were observed in 2M vs. 24M old mouse lung ECs (FIGS. 6D and 6E); when we cultured 2M old mouse lung ECs on FN-coated printed islands of different sizes [49, 50], YAP1 was localized in the nucleus and active on the medium and large islands (900 vs., 2500 µm2), while YAP1 was in the cytosol and inactive when cultured on the smaller islands (600 µm2) (FIGS. 6D and 6E). In contrast, when we cultured 24M old mouse lung ECs on the large islands, YAP1 was excluded from the nucleus, while YAP1 was in the nucleus on the medium size islands (FIGS. 6D and 6E).

CDC42 senses various mechanical forces and its activity was higher in aged human adipose tissue-derived ECs (FIGS. 2B and 2C). Therefore, we also examined whether age-dependent changes in EC size control CDC42 activity. ICC analysis revealed that the levels of GTP-CDC42 were higher in aged ECs cultured on the large island (2500 µm2) compared to those in young ECs cultured on the medium-large island (1600-2500 µm2, FIG. 2D). Reduction of aged EC size by culturing on the medium size island (1600 µm2) decreased the GTP-CDC42 levels (FIG. 2D).

Aged ECs were larger than young ECs and cellular senescence detected by p16$^{INK4A}$ staining was higher in aged ECs compared to young ECs (FIG. 1C, FIG. 5C). Consistently, p16$^{INK4A}$ intensity was higher in aged ECs cultured on large islands (2500 µm2) compared to that in young ECs cultured on the medium size island (1600 µm2), while reduction of aged EC size by culturing aged ECs on medium size islands decreased p16$^{INK4A}$ intensity by 41% (FIG. 2D). EC proliferation detected by nuclear EdU staining in aged adipose ECs cultured on the large islands (2500 µm2) was lower than young ECs cultured on the medium size island (1600 µm2), while culturing aged ECs on medium size islands restored EdU nuclear incorporation (FIG. 2E). These results suggest that age-dependent increases in EC size are associated with decreased YAP1 nuclear localization, increased CDC42 activity, induction of EC senescence, and reduction of EC proliferation in aged ECs.

Figure 3A:
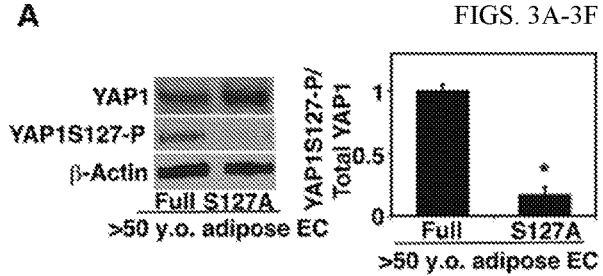
FIGS. 3A-3F show CDC42-YAP1 mediates cell size-dependent changes in EC senescence in aged ECs.
Figure 3B:
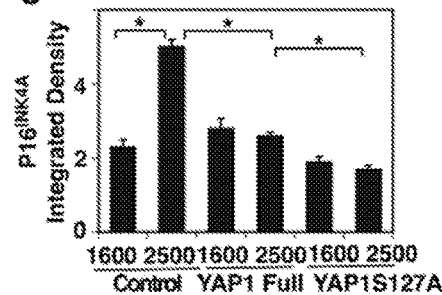
Figure 3C:
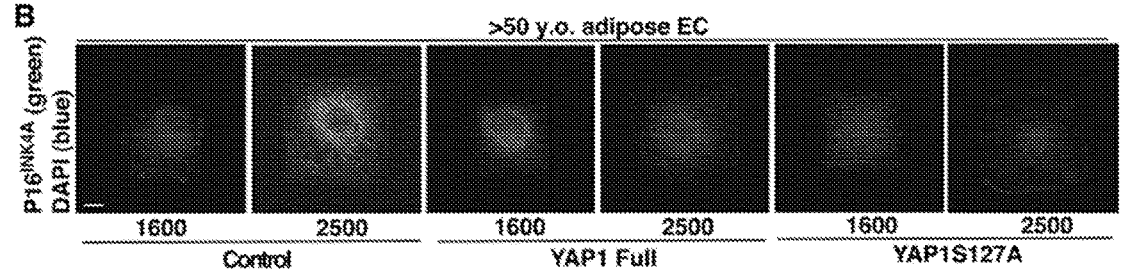

To examine whether YAP1 and CDC42 mediate the effects of age-dependent increase in EC size on EC proliferation and senescence, we manipulated YAP1 activity in aged ECs and cultured them on the island of different sizes. YAP1S127A mutant construct, in which YAP1 S127 phosphorylation residue is mutated to alanine and acts as a constitutively active form of YAP1 [29, 48], inhibited YAP1S127 phosphorylation in aged human adipose ECs compared to that in full-length YAP1-treated control ECs (FIG. 3A). YAP1S127A mutant construct suppressed EC senescence detected by p16$^{INK4A}$ ICC analysis even when these aged ECs were cultured on the large island (2500 µm2) (FIGS. 3B and 3C). We also examined the effects of inhibition of YAP1 activity on cellular senescence and proliferation in young ECs. Lentiviral transduction of YAP mutant construct, which does not bind to TEAD transcription factor and acts as a dominant negative form of YAP1 [23], increased the levels of P16$^{INK4A}$ in young ECs compared to those treated with full-length YAP1 (FIGS. 6F and 6G). YAP1S94A mutant construct also decreased young EC proliferation evaluated using an EdU proliferation assay (FIG. 6H).

Figure 3D:
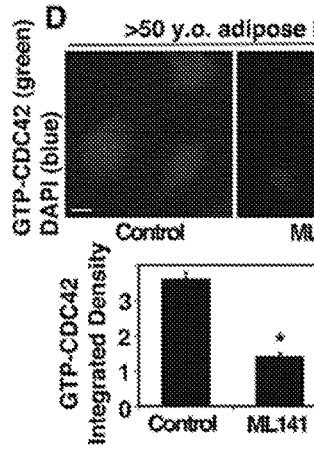
Figure 3E:
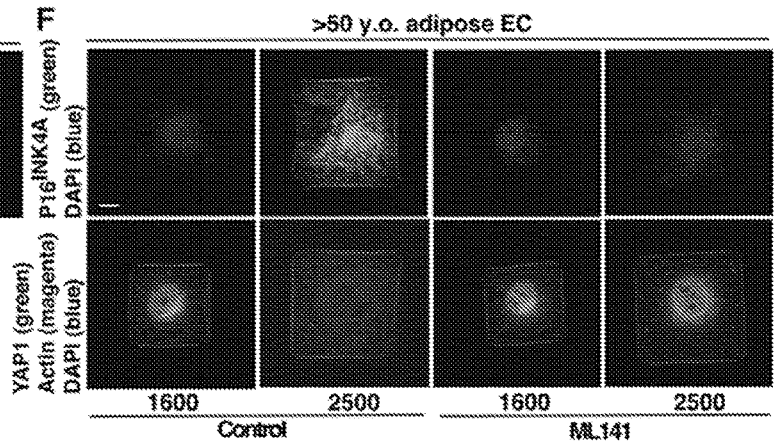
Figure 3F:
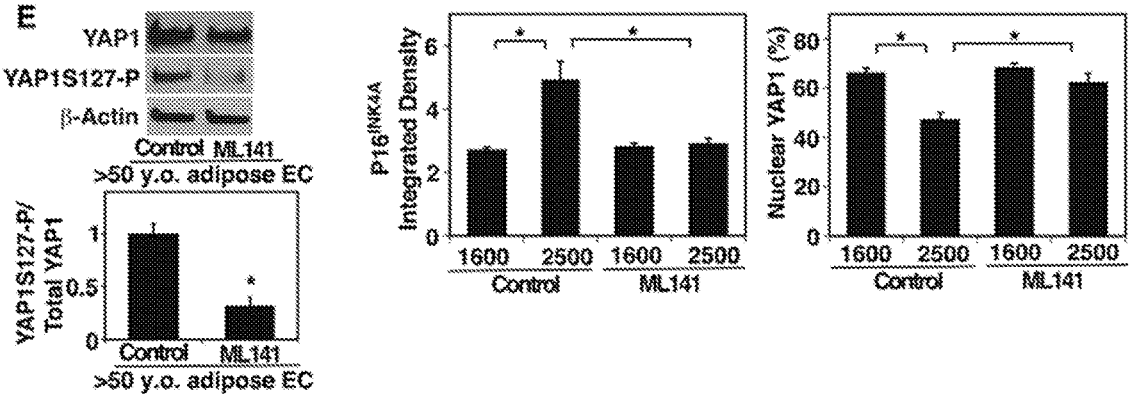

Inhibition of CDC42 activity by treatment with a potent selective inhibitor of CDC42, ML141 (FIG. 3D) decreased YAP1S127 phosphorylation by 72% in aged ECs compared to those without ML141 treatment (FIG. 3E). ML141 stimulated YAP1 nuclear localization in aged ECs cultured on the large island and inhibited EC senescence; the levels of nuclear YAP1 was 1.2-times higher and the intensity of senescence marker p16$^{INK4A}$ was 45% lower in aged ECs treated with ML141 cultured on the large island compared to those without ML141 treatment (FIG. 3F). These results suggest that YAP1 and CDC42 are responsible for age-dependent changes in EC size and control EC senescence.

YAP1 and CDC42 mediate age-dependent decline in angiogenesis—Angiogenesis is impaired in the aged mouse lungs [51]. YAP1 and CDC42 sense the age-dependent changes in EC size and control EC senescence (FIGS. 2 and 3). Therefore, we next examined whether YAP1 and CDC42 mediate age-dependent impairment of angiogenesis using a mouse gel implantation system [9, 23]. When we subcutaneously implanted fibrin gel supplemented with GFP-labeled human adipose ECs and human fibroblasts on the back of the NSG mouse [23], GFP-labeled human young adipose ECs supplemented into the gel formed a well-organized vascular lumen structures in the gel 7 days after implantation as analyzed using confocal fluorescence microscopy (FIG. 4A). In contrast, GFP-labeled aged adipose ECs supplemented in the gel formed a disorganized vasculature with randomly oriented filopodia in the gel; vessel area was not significantly different in the gel supplemented with young vs. aged ECs, while vessel length was 76% shorter in aged ECs (FIG. 4A). A CDC42 inhibitor, ML141, restored blood vessel structures in the gel supplemented with aged human adipose ECs; aged EC-derived blood vessels were 2.5-times longer in the gel treated with ML141 (FIG. 4A). When we subcutaneously implanted gel supplemented with young vs. aged ECs and perfused with Alexa 594-labeled dextran by systemic injection, injected dextran was leaked more in the gel supplemented with aged ECs compared to that supplemented with young ECs, while ML141 attenuated the leakage of dextran (FIG. 4B), suggesting that inhibition of CDC42 restores vascular function in aged ECs in the gel.

In an in vitro cell culture study human adipose endothelial cells were treated with ML141 (500 nM with DMSO). In an in vivo mouse study hydrogel mixed with young or aged human endothelial cells or in combination with ML141 (500 nM with DMSO) was implanted on the back of the immunocompromised mouse. One week later, the gel was removed and analyzed blood vessel formation using immunohistochemical analysis.

Overexpression of YAP1S127A in aged human ECs also reversed the disorganized vascular formation in the gel compared to that supplemented with full-length YAP1-treated control ECs; although vessel area was not significantly different in the gels supplemented with aged ECs overexpressing YAP1 full and YAP1S127A, vessel length increased by 1.3-fold in aged EC-derived blood vessels treated with YAP (FIG. 4C). These findings imply that lower YAP1 activity and higher CDC42 activity mediate age-dependent impairment of angiogenesis.

In this example, we have demonstrated that aged mouse and human ECs are significantly larger than young ECs. The levels of YAP1 activity decrease, while CDC42 activity increases in aged ECs. When we culture aged human adipose ECs on single-cell sized FN-coated large islands, YAP1 is excluded from the nucleus, while reduction of the aged EC size restores YAP1 nuclear localization. Reduction of aged EC size also decreases CDC42 activity, stimulates EC proliferation and attenuates EC senescence. Inhibition of CDC42 activity decreases YAP1S127 phosphorylation and the YAP mutant construct or CDC42 inhibitor attenuates cellular senescence of aged ECs cultured on the large island. YAP or the CDC42 inhibitor also restores blood vessel structures disrupted in aged ECs in the subcutaneously implanted gel. These results suggest that age-dependent increases in EC size impair EC proliferation, induce EC senescence, and disrupt blood vessel formation through aberrant CDC42-YAP1 signaling.

We directly measured the size of young and aged human and mouse ECs from various origins, such as small blood vessels from human adipose tissues, large blood vessels from mouse descending aorta, and pulmonary blood vessels from mouse PA ex vivo. We found that aged ECs are consistently larger compared to young ECs. Although it is reported that senescent or highly passaged cultured cells are larger [13, 14], to the best of our knowledge, this is the first report measuring the young vs. aged EC size in the ex vivo blood vessels, which may more accurately reflect the response in blood vessels in vivo.

Although YAP1 is known to mediate cell size-dependent signaling [18, 24, 25], the involvement of YAP1 signaling in age-dependent changes in cell size using young vs. aged ECs has not been explored. It has been reported that large cells age faster than small cells and decrease lifespan [16] and that vascular aging has significant impact on lifespan [52]. Thus, modulation of aged EC size and/or manipulation of the activity of YAP1 and CDC42 may lead to the development of promising therapeutic strategy for age-related diseases and would also be a strategy to delay the aging processes and extend lifespan.

We have demonstrated that nuclear YAP1 is lower when aged EC was cultured on a large island (mimics aged cell size), while YAP1 localizes in the nucleus when the aged cell size is reduced by culturing on a medium size island (mimics young cell size). However, when cell size is further reduced by culturing on a smaller size island, YAP1 activity decreases. Consistently, P16$^{INK4A}$ levels are high when aged EC was cultured on a large island. P16$^{INK4A}$ levels decrease when the aged cell size is reduced by culturing on a medium size island. However, when cell size is further reduced, P16$^{INK4A}$ levels increase again. Thus, nuclear YAP1 correlates with P16$^{INK4A}$ levels and appropriate medium cell size is necessary for YAP1 nuclear translocation and lowering P16$^{INK4A}$ levels in aged ECs. Regarding GTP-CDC42, consistent with nuclear YAP1, the levels of GTP-CDC42 are higher when aged EC was cultured on a large island. The GTP-CDC42 levels decrease when the aged cell size is reduced by culturing on a medium size island. However, inconsistent with nuclear YAP1, even when cell size is further reduced by culturing on a smaller size island, the GTP-CDC42 levels did not increase. This may be because other Rho small GTPases or actin cytoskeleton-related proteins are involved in the mechanism in aged cells in the range of cell size. Alternatively, reduction of YAP1 activity in aged ECs on the small island may feedback to inhibit CDC42 activity.

Aged tissues are exposed to aberrant ECM stiffness [12] and blood flow [5], which changes cell size [53] and contributes to various age-dependent cardiovascular diseases including hypertension and atherosclerosis [54, 55]. We have reported that changes in ECM stiffness alter EC shape and size, and consequently modulate angiogenic gene expression, EC proliferation, behaviors, and function [9-11]. Thus, age-dependent increases in EC size induced by aberrant micromechanical environment may disturb angiogenesis and contribute to various diseases in aged adults, and investigation of the signaling mechanism by which EC size directly controls EC behaviors using the microcontact printing system would further our understanding of the mechanism of aging. In addition to EC size, cell geometry, adhesion area, and ECM components also change cytoskeletal structure and may affect YAP1 and CDC42 activity and related signaling (e.g., Rho) [8, 17, 18, 29, 50, 56-58]. Culturing ECs on microcontact printed islands of different shapes (circle, square, triangle, rectangle) [24, 25, 56, 57], different adhesion area [24, 57, 58], or coated with different ECMs (e.g., collagen) will elucidate the mechanism.

We have demonstrated that YAP1 and CDC42 mediate aged EC size-dependent inhibition of EC proliferation and angiogenesis. Another Hippo signaling molecule, transcriptional co-activator with PDZ-binding motif (TAZ), which has similar molecular architectures and controls angiogenesis [20], has distinct biological activities from YAP1 [59]. YAP1/TAZ also control cell size and mechanics [25], and there may be a feedback mechanism. In addition, cell size controls EC proliferation through other mechanosensitive genes. For example, mechanosensitive transcription factors (e.g., TFII-I, GATA2, TWIST1) control angiogenesis and EC integrity, and contribute to angiogenesis-related diseases (e.g., pulmonary fibrosis, pulmonary hypertension) [9, 60, 61]. Wnt co-receptor LRP5, which controls YAP1/TAZ activity [62], mediates ECM stiffness-induced Tie2 expression in ECs, and modulates lung development and age-dependent inhibition of post-PNX lung growth by changing angiogenesis [51, 63]. The expression of TWIST1 is regulated by YAP1 [64] and controls cellular senescence [65]. YAP1 also controls angiogenesis through PGC1α [23], which regulates mitochondrial biogenesis and metabolism [66] and contributes to aging processes [67]. It has been reported that increasing organismal size correlates with lower oxygen consumption in mitochondria and cellular functionality [15], and therefore age-dependent increases in cell size may suppress cell proliferation in aged adults by impairment of cellular metabolism as well. Further characterization of the YAP1-related mechanosensitive signaling pathways will elucidate the mechanism.

Our results suggest that increases in aged EC size stimulate CDC42 activity, which results in the suppression of YAP1 activity and induces EC senescence. This seems to contradict others' reports showing that YAP1 is in the nucleus and active in spreading cells (i.e., cells are larger)

[24, 48]. The response of YAP1 activity to cell size would be different between young cells and aged cells. Although we have demonstrated that inhibition of CDC42 activity stimulates YAP1 activity in aged ECs (FIG. 3), it is reported that inhibition of CDC42 suppresses YAP1 activity in alveolar type II cells during lung regeneration after PNX in young adult mice [43]. The response of YAP1 to CDC42 may be different among cell types and ages of the cells. CDC42 controls YAP1 activity but YAP1 also induces CDC42 activity and controls developmental angiogenesis and vascular integrity [20, 22]. A complex feedback mechanism to control YAP1 and CDC42 activity may be involved in the mechanism. Other CDC42-related signaling molecules (e.g., Rho, Rac, integrins) that control actin cytoskeleton in a distinct way also interact with each other and regulate EC proliferation in a context dependent manner [8, 50, 56-58]. For example, increases in Rho activity stimulate YAP1 activity and inhibit stem cell apoptosis [68]. Integrin signaling, which modulates cell size and shape, mediates mechanical force-dependent YAP1/TAZ activity in various tissues [69-71]. Spatiotemporal control of YAP1/CDC42 activity and maintenance of appropriate cell size will be required to maintain young blood vessel structures in the organs.

It remains unclear the mechanism by which aging increases EC size. Multiple factors such as changes in ECM components and mechanics, oxygen stress, nutrients, and compensatory response to damaged cells (cell competition) [72] would be involved in the mechanism. Recently, it has been reported that fibroblast membranes extend to fill the empty space of lost neighboring fibroblasts rather than proliferation or migration during homeostasis and aging [73]. In addition to ECs, epithelial cells and other cells (e.g., smooth muscle cells, fibroblasts, and immune cells) secrete angiogenic and other chemical factors [74], which may indirectly control EC size and shape in aged tissues. Further analysis of the effects of aging on the size of ECs and other cell types will be necessary to elucidate the mechanism by which aging impairs angiogenesis and epithelial morphogenesis.

We have investigated the effects of aged cell size on EC proliferation and senescence using ECs isolated from human adipose tissues with a variety of conditions that can affect EC size and angiogenic activity. We excluded the samples from cancer patients but other diseases were included in the cohort. The average BMI of the study population is higher than 30 kg/m2. However, when we analyzed the EC size in young vs. aged lean group (BMI, <30 kg/m2) and obese group (BMI, >30 kg/m2), aged ECs are significantly larger compared to young ECs in both lean and obese groups (not shown), suggesting that age-dependent changes in EC size may not be dependent on the level of obesity. The heterogeneity of the samples due to cardiovascular condition (e.g., hypertension, hyperlipidemia, and diabetes mellitus), sex, and collected regions of the body (visceral, subcutaneous) may impact the EC size and subsequent signaling pathways. Further investigation in another cohort with a larger sample size will be necessary to elucidate the effects of aged EC size on angiogenesis.

In summary, we have demonstrated that age-dependent increases in EC size induce EC senescence and suppress angiogenesis through CDC42-YAP1 signaling. Modulation of EC size or YAP1 or CDC42 activity would potentially lead to the development of new therapeutic strategies for aging-related diseases.

Materials and Methods

Materials—The following reagents were used: Anti-paxillin and -VE-cadherin antibodies (Transduction Laboratories, Lexington, KY); anti-BrdU, -p16$^{INK4A}$, and -phospho-YAP1 (Ser 127) antibodies (Abcam, Cambridge, MA); anti-β-actin monoclonal antibody (Sigma, St. Louis, MO); anti-YAP1 antibody (Santa Cruze Biotechnology, Dallas, TX); anti-GTP-CDC42 antibody (NewEast Biosciences, King of Prussia, PA); anti-YAP1 and -CDC42 antibodies (Cell Signaling Technology, Danvers, MA); ML141 (Sigma).

Human adipose tissue acquisition—Fresh human subcutaneous adipose tissues (n=55 people) were obtained as discarded surgical specimens from patients undergoing abdominal surgeries. After surgical removal, samples were placed in ice-cold HEPES buffer and immediately transferred to the laboratory for isolated vessel studies. De-identified patient demographic data were collected using the Generic Clinical Research Database (GCRD) at the Medical College of Wisconsin. All protocols were approved by the Institutional Review Board of the Medical College of Wisconsin and Froedtert Hospital. Sample demographic information is summarized in Table 1. The patients with any types of cancer were excluded.

Mouse lung EC isolation—Mouse pulmonary artery and descending aorta were dissected from C57BL6 mice of different ages (2M and 24M old). Mouse lung ECs were isolated from C57BL6 mice of different ages (2M and 24M old) using anti-CD31 conjugated magnetic beads and sorted by FACS (CD31+, VE-Cadherin+, CD45−) as previously reported [51]. Isolated ECs were validated as ECs by FACS. Isolated mouse ECs were cultured in EBM2 medium containing 5% FBS and growth factors (VEGF, bFGF and PDGF) [51] and were used between passages 1-2.

Plasmid construction and gene knockdown—The retroviral full-length pQCXIH-myc-YAP1 (human) and pQCXIH-flag-YAP1-S127A (human) were gifts from Kun-liang Guan (Addgene plasmid #33091 and #33092) [75]. pLX304-YAP1 (S94A) (human) construct was a gift from William Hahn (Addgene plasmid #59145) [76]. As a control, plasmid with vector only or full-length YAP1 construct was used. Generation of retroviral vectors was accomplished as reported [9]. Viral supernatants were collected starting 48 h after transfection, for four consecutive times every 12 h, pooled, and filtered through a 0.45 µm filter. Viral supernatants were then concentrated 100-fold by ultracentrifugation in a Beckman centrifuge for 1.5 h at 16,500 rpm. Human adipose ECs were incubated with viral stocks in the presence of 5 µg/ml polybrene (Sigma) and 90-100% infection was achieved 3 days later [9, 23]. The ratio of the levels of exogenous YAP1 to endogenous YAP1 in the aged ECs retrovirally transduced YAP1 and YAP1S127A were 3.2 and 5.6, respectively (not shown), indicating that retroviral transduction of these proteins overcomes the endogenous effects.

Cell biological methods—Blood vessels isolated from mouse pulmonary artery, mouse descending aorta, or human adipose tissues were stained with silver nitrate as previously reported [44, 45]. Under the dissection microscope, we dissected blood vessels with a length of circumference of 300 µm (a diameter of approximately 50 µm) from the adipose tissue. The blood vessels were cannulated with a 25G metal blunt needle and consecutively perfused with 2% PFA, 5% glucose, 0.2% AGNO3, 5% glucose and 2% PFA. After perfusion, the blood vessels were cut open and mounted on the slide. Under light microscope, endothelial cell-cell junctions were visualized and cell size was measured on at least five images using ImageJ software (NIH). For cultured ECs, we immunostained ECs with VE-cadherin and imaged cell-cell junctions using a confocal Leica SP5 microscope. Cell size was measured on at least five images using ImageJ software.

The ECs were isolated as described before [77]. Briefly, after removing the fibrotic and cauterized regions, about 5 g of subcutaneous adipose tissue was minced using small scissors and transferred into 15 ml tubes containing 5 ml of 1 mg/ml Collagenase A (Roche, Basel Switzerland). The sample was digested by intermittent pipetting for 30 min at 37° C. and filtered through 40 µm nylon mesh. The cells were washed with PBS and treated with RBC lysis buffer (Sigma). After washing with PBS, the cells were mixed with CD31-conjugated magnetic beads (Dynabeads®, Invitrogen) and the ECs were isolated according to the manufacture's protocol and sorted by FACS (CD31+, VE-Cadherin+, CD45−) as previously reported [51]. Isolated ECs were validated as ECs by FACS. Isolated human adipose ECs were cultured on attachment factor (Cell Systems, Kirkland, WA)-coated dish with endothelial basal medium (EBM2) containing 5% FBS and growth factors (VEGF, bFGF and PDGF). Isolated ECs were used between passages 1-3.

EC proliferation was analyzed by a BrdU incorporation assay or a Click-iT® Plus EdU Proliferation Assay. Mouse lung and human adipose ECs were plated in EBM2 with 2% serum, pulsed with 5 µM BrdU for 16 h, immunostained and imaged using a confocal Leica SP5 microscope. Cellular senescence was characterized using a SA-β galactosidase assay kit (cell signaling) or anti-P16$^{INK4A}$ staining. The specificity of P16$^{INK4A}$ staining was confirmed by 2nd Ab alone staining (Supplementary FIG. 1D). The microscopic images were analyzed on at least five images using imageJ software (NIH) and the same contrast and brightness were used to compare the images.

Molecular biological and biochemical methods—RNA was isolated using an RNeasy mini kit (Qiagen, Valencia, CA, USA). Quantitative reverse transcription (qRT)-PCR was performed with the iScript reverse transcription and iTaq SYBR Green qPCR kit (BioRad, Hercules, CA) using the BioRad real time PCR system (BioRad). Cyclophilin and ($\beta$2 microglobulin (B2M) controlled for overall cDNA content. The primers used were human P16$^{INK4A}$; forward 5'-GATCCAGGTGGGTAGAAGGTC-3' (SEQ ID NO:1), reverse 5'-CCCCTGCAAACTTCGTCCT-3' (SEQ ID NO:2); mouse P16$^{Ink4a}$, forward 5'-CGCAGGTTCTTGGT-CACTGT-3' (SEQ ID NO:3), reverse 5'-TGTT-CACGAAAGCCAGAGCG-3' (SEQ ID NO:4). The primers used for human and mouse YAP1, mouse cyclophilin and human B2M were previously described [9, 23]. CDC42 activity was measured using the CDC42 pull-down activity assay kit (Cytoskeleton, Denver, CO).

Microcontact printing system—Stamps were created using soft lithography as described previously [10, 49, 50]. Polydimethylsiloxane (PDMS) stamps were made by casting the polymer against master molds made by standard photolithography using the negative photoresist SU-8 (MicroChem). Substrates for stamping were fabricated by spin-coating a thin layer of PDMS (Sylgard-184, Dow Corning) onto glass coverslips. To coat a coverslip, a drop of PDMS (200 µl for a 25 mm×25 mm coverslip, Corning) was applied to the center of the coverslip and spun at 4000 rpm for 4 minutes on a spin-coater (Specialty Coating Systems G3-8, Cookson Electronics) and cured at 60° C. for one hour. Prior to stamping, PDMS stamps were cleaned in 70% ethanol in a sonicating water bath for 30 minutes, rinsed with water, and dried using filtered compressed air or nitrogen gas. The surface of the clean stamps containing the raised micropatterned features were incubated with 50 µg/ml FN in aqueous solution for one hour, and dried thoroughly with filtered nitrogen gas or compressed air. Directly before use, the PDMS-coated coverslips were activated by oxygen plasma in a UVO cleaner (Jelight) for 8 minutes, during which time inked PDMS stamps were dried. The stamps were then pressed gently against the plasma-treated PDMS surface to ensure complete contact of stamp with substrate. Unstamped areas were blocked by incubation in 1% Pluronic-127 for 1 hour at room temperature or overnight at 4° C. Before plating cells, substrates were washed three times with PBS to remove residual Pluronic-127. 1×104 ECs in 1.5 ml culture medium were plated on the coverslips (22 mm×22 mm), which allows each cell to fit on each single FN-island on the coverslip. The cells were cultured for 16 hours.

Mouse subcutaneous fibrin gel implantation—The in vivo animal study was carried out in strict accordance with the recommendations in the Guide for the Care and Use of Laboratory Animals of the National Institutes of Health. The protocol was reviewed and approved by the Animal Care and Use Committee of Medical College of Wisconsin. NOD scid gamma (NSG) mice (8 week old; Jackson Laboratory) and C57BL6 mice (Jackson Laboratory and NIA/NIH rodent colonies) were used for the study. Fibrin gel was fabricated as described [51, 60, 61]. Briefly, we added 20 µl of thrombin (2.5 U/ml) to 20 µl of fibrinogen solution (12.5 mg/ml) and supplemented gel with GFP-labeled human adipose ECs (1×106 cells), in which gene expression was manipulated, and human dermal fibroblasts (3×105 cells, ATCC). The drops of the gel were incubated at 37° C. for 30 min until they solidified [60, 61]. For treatment with ML141, we mixed the gel with ML141 (final concentration; 500 nM). We then implanted the gel subcutaneously on the back of NSG mice for 7 days as previously described [9, 23]. Vascular network formation of GFP-labeled human adipose ECs was evaluated by measuring the area and length of GFP-labeled blood vessels from five different areas of the gel [9, 60, 61]. The vascular permeability was measured using low MW fluorescently labeled dextran (MW 4000, Sigma) leakage [11]. Fluorescent images were taken on a Leica TCS SP5 confocal laser scanning microscope and morphometric analysis was performed using ImageJ and Angiotool softwares [9, 60, 61].

Statistical analysis—All phenotypic analysis was performed by masked observers unaware of the identity of experimental groups. Error bars (SEM) and p values were determined from the results of three or more independent experiments. The F test (for two samples) or the Levene test (for more than two samples) was performed to confirm that the variances are homogeneous. Student's t-test was used for statistical significance for two groups. For more than two groups, one-way ANOVA with a post-hoc analysis using the Bonferroni test was conducted.

REFERENCES

1. Carmeliet P, Jain R K. Molecular mechanisms and clinical applications of angiogenesis. Nature. 2011; 473:298-307.
2. Chung A S, Ferrara N. Developmental and pathological angiogenesis. Annu Rev Cell Dev Biol. 2011; 27:563-84.
3. Adnot S, Amsellem V, Boyer L, Marcos E, Saker M, Houssaini A, Kebe K, Dagouassat M, Lipskaia L, Boczkowski J. Telomere Dysfunction and Cell Senescence in Chronic Lung Diseases: therapeutic Potential. Pharmacol Ther. 2015; 153:125-34.
4. Lahteenvuo J, Rosenzweig A. Effects of aging on angiogenesis. Circ Res. 2012; 110:1252-64.

5. Rivard A, Fabre J E, Silver M, Chen D, Murohara T, Kearney M, Magner M, Asahara T, Isner J M. Age-dependent impairment of angiogenesis. Circulation. 1999; 99:111-20.
6. Mammoto A, Mammoto T, Ingber D E. Mechanosensitive mechanisms in transcriptional regulation. J Cell Sci. 2012; 125:3061-73.
7. Baeyens N, Bandyopadhyay C, Coon B G, Yun S, Schwartz M A. Endothelial fluid shear stress sensing in vascular health and disease. J Clin Invest. 2016; 126:821-28.
8. Mammoto A, Huang S, Moore K, Oh P, Ingber D E. Role of RhoA, mDia, and ROCK in cell shape-dependent control of the Skp2-p27kip1 pathway and the G1/S transition. J Biol Chem. 2004; 279:26323-30.
9. Mammoto A, Connor K M, Mammoto T, Yung C W, Huh D, Aderman C M, Mostoslaysky G, Smith L E, Ingber D E. A mechanosensitive transcriptional mechanism that controls angiogenesis. Nature. 2009; 457:1103-08.
10. Mammoto T, Jiang A, Jiang E, Panigrahy D, Kieran M W, Mammoto A. Role of collagen matrix in tumor angiogenesis and glioblastoma multiforme progression. Am J Pathol. 2013; 183:1293-305.
11. Mammoto A, Mammoto T, Kanapathipillai M, Wing Yung C, Jiang E, Jiang A, Lofgren K, Gee E P, Ingber D E. Control of lung vascular permeability and endotoxin-induced pulmonary oedema by changes in extracellular matrix mechanics. Nat Commun. 2013; 4:1759.
12. Huynh J, Nishimura N, Rana K, Peloquin J M, Califano J P, Montague C R, King M R, Schaffer C B, Reinhart-King C A. Age-related intimal stiffening enhances endothelial permeability and leukocyte transmigration. Sci Transl Med. 2011; 3:112ra122.
13. Sokolov I, Guz N V, Iyer S, Hewitt A, Sokolov N A, Erlichman J S, Woodworth C D. Recovery of aging-related size increase of skin epithelial cells: in vivo mouse and in vitro human study. PLoS One. 2015; 10:e0122774.
14. Biran A, Zada L, Abou Karam P, Vadai E, Roitman L, Ovadya Y, Porat Z, Krizhanovsky V. Quantitative identification of senescent cells in aging and disease. Aging Cell. 2017; 16:661-71.
15. Miettinen T P, Bjorklund M. Mitochondrial Function and Cell Size: An Allometric Relationship. Trends Cell Biol. 2017; 27:393-402.
16. Yang J, Dungrawala H, Hua H, Manukyan A, Abraham L, Lane W, Mead H, Wright J, Schneider B L. Cell size and growth rate are major determinants of replicative lifespan. Cell Cycle. 2011; 10:144-55.
17. Piccolo S, Cordenonsi M, Dupont S. Molecular pathways: YAP and TAZ take center stage in organ growth and tumorigenesis. Clin Cancer Res. 2013; 19:4925-30.
18. Panciera T, Azzolin L, Cordenonsi M, Piccolo S. Mechanobiology of YAP and TAZ in physiology and disease. Nat Rev Mol Cell Biol. 2017; 18:758-70.
19. Choi H J, Zhang H, Park H, Choi K S, Lee H W, Agrawal V, Kim Y M, Kwon Y G. Yes-associated protein regulates endothelial cell contact-mediated expression of angiopoietin-2. Nat Commun. 2015; 6:6943.
20. Kim J, Kim Y H, Kim J, Park D Y, Bae H, Lee D H, Kim K H, Hong S P, Jang S P, Kubota Y, Kwon Y G, Lim D S, Koh G Y. YAP/TAZ regulates sprouting angiogenesis and vascular barrier maturation. J Clin Invest. 2017; 127:3441-61.
21. Nakajima H, Yamamoto K, Agarwala S, Terai K, Fukui H, Fukuhara S, Ando K, Miyazaki T, Yokota Y, Schmelzer E, Belting H G, Affolter M, Lecaudey V, et al. Flow-Dependent Endothelial YAP Regulation Contributes to Vessel Maintenance. Dev Cell. 2017; 40:523-536 e526.
22. Sakabe M, Fan J, Odaka Y, Liu N, Hassan A, Duan X, Stump P, Byerly L, Donaldson M, Hao J, Fruttiger M, Lu Q R, Zheng Y, et al. YAP/TAZ-CDC42 signaling regulates vascular tip cell migration. Proc Natl Acad Sci USA. 2017; 114:10918-23.
23. Mammoto A, Muyleart M, Kadlec A, Gutterman D, Mammoto T. YAP1-TEAD1 signaling controls angiogenesis and mitochondrial biogenesis through PGC1α. Microvasc Res. 2018; 119:73-83.
24. Dupont S, Morsut L, Aragona M, Enzo E, Giulitti S, Cordenonsi M, Zanconato F, Le Digabel J, Forcato M, Bicciato S, Elvassore N, Piccolo S. Role of YAP/TAZ in mechanotransduction. Nature. 2011; 474:179-83.
25. Nardone G, Oliver-De La Cruz J, Vrbsky J, Martini C, Pribyl J, Skládal P, Pel M, Caluori G, Pagliari S, Martino F, Maceckova Z, Hajduch M, Sanz-Garcia A, et al. YAP regulates cell mechanics by controlling focal adhesion assembly. Nat Commun. 2017; 8:15321.
26. Aragona M, Panciera T, Manfrin A, Giulitti S, Michielin F, Elvassore N, Dupont S, Piccolo S. A mechanical checkpoint controls multicellular growth through YAP/TAZ regulation by actin-processing factors. Cell. 2013; 154:1047-59.
27. Calvo F, Ege N, Grande-Garcia A, Hooper S, Jenkins R P, Chaudhry S I, Harrington K, Williamson P, Moeendarbary E, Charras G, Sahai E. Mechanotransduction and YAP-dependent matrix remodelling is required for the generation and maintenance of cancer-associated fibroblasts.
28. Wang K C, Yeh Y T, Nguyen P, Limqueco E, Lopez J, Thorossian S, Guan K L, Li Y J, Chien S. Flow-dependent YAP/TAZ activities regulate endothelial phenotypes and atherosclerosis. Proc Natl Acad Sci USA. 2016; 113: 11525-30.
29. Piccolo S, Dupont S, Cordenonsi M. The biology of YAP/TAZ: hippo signaling and beyond. Physiol Rev. 2014; 94:1287-312.
30. Xie Q, Chen J, Feng H, Peng S, Adams U, Bai Y, Huang L, Li J, Huang J, Meng S, Yuan Z. YAP/TEAD-mediated transcription controls cellular senescence. Cancer Res. 2013; 73:3615-24.
31. Loforese G, Malinka T, Keogh A, Baier F, Simillion C, Montani M, Halazonetis T D, Candinas D, Stroka D. Impaired liver regeneration in aged mice can be rescued by silencing Hippo core kinases MST1 and MST2. EMBO Mol Med. 2017; 9:46-60.
32. Fu J, Zheng M, Zhang X, Zhang Y, Chen Y, Li H, Wang X, Zhang J. Fibulin-5 promotes airway smooth muscle cell proliferation and migration via modulating Hippo-YAP/TAZ pathway. Biochem Biophys Res Commun. 2017; 493:985-91. 33. Liu F, Lagares D, Choi K M, Stopfer L, Marinković A, Vrbanac V, Probst C K, Hiemer S E, Sisson T H, Horowitz J C, Rosas I O, Fredenburgh L E, Feghali-Bostwick C, et al. Mechanosignaling through YAP and TAZ drives fibroblast activation and fibrosis. Am J Physiol Lung Cell Mol Physiol. 2015; 308:L344-57.
34. Kurakin A, Bredesen D E. Dynamic self-guiding analysis of Alzheimer's disease. Oncotarget. 2015; 6:14092-122.
35. Xu M, Zhang D F, Luo R, Wu Y, Zhou H, Kong L L, Bi R, Yao Y G. A systematic integrated analysis of brain expression profiles reveals YAP1 and other prioritized hub genes as important upstream regulators in Alzheimer's disease. Alzheimers Dement. 2018; 14:215-29.

36. Katsumi A, Orr A W, Tzima E, Schwartz M A. Integrins in mechanotransduction. J Biol Chem. 2004; 279:12001-04.
37. Cau J, Hall A. Cdc42 controls the polarity of the actin and microtubule cytoskeletons through two distinct signal transduction pathways. J Cell Sci. 2005; 118:2579-87.
38. Nguyen D T, Gao L, Wong A, Chen C S. Cdc42 regulates branching in angiogenic sprouting in vitro. Microcirculation. 2017; 24:e12372.
39. Basagiannis D, Zografou S, Murphy C, Fotsis T, Morbidelli L, Ziche M, Bleck C, Mercer J, Christoforidis S. VEGF induces signalling and angiogenesis by directing VEGFR2 internalisation through macropinocytosis. J Cell Sci. 2016; 129:4091-104.
40. Chaker D, Mouawad C, Azar A, Quilliot D, Achkar I, Fajloun Z, Makdissy N. Inhibition of the RhoGTPase Cdc42 by ML141 enhances hepatocyte differentiation from human adipose-derived mesenchymal stem cells via the Wnt5a/PI3K/miR-122 pathway: impact of the age of the donor. Stem Cell Res Ther. 2018; 9:167.
41. Florian M C, Klenk J, Marka G, Soller K, Kiryakos H, Peter R, Herbolsheimer F, Rothenbacher D, Denkinger M, Geiger H. Expression and Activity of the Small RhoGTPase Cdc42 in Blood Cells of Older Adults Are Associated With Age and Cardiovascular Disease. J Gerontol A Biol Sci Med Sci. 2017; 72:1196-200.
42. Umbayev B, Masoud A R, Tsoy A, Alimbetov D, Olzhayev F, Shramko A, Kaiyrlykyzy A, Safarova Y, Davis T, Askarova S. Elevated levels of the small GTPase Cdc42 induces senescence in male rat mesenchymal stem cells. Biogerontology. 2018; 19:287-301.
43. Liu Z, Wu H, Jiang K, Wang Y, Zhang W, Chu Q, Li J, Huang H, Cai T, Ji H, Yang C, Tang N. MAPK-Mediated YAP Activation Controls Mechanical-Tension-Induced Pulmonary Alveolar Regeneration. Cell Rep. 2016; 16:1810-19.
44. Booyse F M, Osikowicz G, Quarfoot A J. Effects of chronic oral consumption of nicotine on the rabbit aortic endothelium. Am J Pathol. 1981; 102:229-38.
45. McDonald D M. Endothelial gaps and permeability of venules in rat tracheas exposed to inflammatory stimuli. Am J Physiol. 1994; 266:L61-83.
46. Campisi J. Cellular Senescence and Lung Function during Aging. Yin and Yang. Ann Am Thorac Soc. 2016 (Suppl 5); 13:S402-06.
47. Campisi J. Aging, cellular senescence, and cancer. Annu Rev Physiol. 2013; 75:685-705.
48. Ota M, Sasaki H. Mammalian Tead proteins regulate cell proliferation and contact inhibition as transcriptional mediators of Hippo signaling. Development. 2008; 135:4059-69.
49. Mammoto A, Sero J E, Mammoto T, Ingber D E. Methods for studying mechanical control of angiogenesis by the cytoskeleton and extracellular matrix. Methods Enzymol. 2008; 443:227-59.
50. Sero J E, Thodeti C K, Mammoto A, Bakal C, Thomas S, Ingber D E. Paxillin mediates sensing of physical cues and regulates directional cell motility by controlling lamellipodia positioning. PLoS One. 2011; 6:e28303.
51. Mammoto A, Muyleart M, Mammoto T. LRP5 in age-related changes in vascular and alveolar morphogenesis in the lung. Aging (Albany NY). 2019; 11:89-103.
52. Osmanagic-Myers S, Kiss A, Manakanatas C, Hamza O, Sedlmayer F, Szabo P L, Fischer I, Fichtinger P, Podesser B K, Eriksson M, Foisner R. Endothelial progerin expression causes cardiovascular pathology through an impaired mechanoresponse. J Clin Invest. 2019; 129:531-45.
53. Yeh Y C, Ling J Y, Chen W C, Lin H H, Tang M J. Mechanotransduction of matrix stiffness in regulation of focal adhesion size and number: reciprocal regulation of caveolin-1 and (31 integrin. Sci Rep. 2017; 7:15008.
54. Lacolley P, Regnault V, Segers P, Laurent S. Vascular Smooth Muscle Cells and Arterial Stiffening: Relevance in Development, Aging, and Disease. Physiol Rev. 2017; 97:1555-617.
55. Ando J, Yamamoto K. Flow detection and calcium signalling in vascular endothelial cells. Cardiovasc Res. 2013; 99:260-68.
56. Brock A, Chang E, Ho C C, LeDuc P, Jiang X, Whitesides G M, Ingber D E. Geometric determinants of directional cell motility revealed using microcontact printing. Langmuir. 2003; 19:1611-17.
57. Bao M, Xie J, Piruska A, Huck W T. 3D microniches reveal the importance of cell size and shape. Nat Commun. 2017; 8:1962.
58. Chen C S, Mrksich M, Huang S, Whitesides G M, Ingber D E. Geometric control of cell life and death. Science. 1997; 276:1425-28.
59. Kodaka M, Hata Y. The mammalian Hippo pathway: regulation and function of YAP1 and TAZ. Cell Mol Life Sci. 2015; 72:285-306.
60. Mammoto T, Muyleart M, Konduri G G, Mammoto A. Twist1 in hypoxia-induced pulmonary hypertension through TGFβ-Smad signaling. Am J Respir Cell Mol Biol. 2018; 58:194-207.
61. Mammoto T, Jiang A, Jiang E, Mammoto A. Role of Twist1 Phosphorylation in Angiogenesis and Pulmonary Fibrosis. Am J Respir Cell Mol Biol. 2016; 55:633-44.
62. Azzolin L, Panciera T, Soligo S, Enzo E, Bicciato S, Dupont S, Bresolin S, Frasson C, Basso G, Guzzardo V, Fassina A, Cordenonsi M, Piccolo S. YAP/TAZ incorporation in the f3-catenin destruction complex orchestrates the Wnt response. Cell. 2014; 158:157-70.
63. Mammoto T, Jiang E, Jiang A, Mammoto A. ECM structure and tissue stiffness control postnatal lung development through the LRP5-Tie2 signaling system. Am J Respir Cell Mol Biol. 2013; 49:1009-18.
64. Zhang H, von Gise A, Liu Q, Hu T, Tian X, He L, Pu W, Huang X, He L, Cai C L, Camargo F D, Pu W T, Zhou B. Yap 1 is required for endothelial to mesenchymal transition of the atrioventricular cushion. J Biol Chem. 2014; 289:18681-92.
65. Lee S H, Lee J H, Yoo S Y, Hur J, Kim H S, Kwon S M. Hypoxia inhibits cellular senescence to restore the therapeutic potential of old human endothelial progenitor cells via the hypoxia-inducible factor-1α-TWIST-p21 axis. Arterioscler Thromb Vasc Biol. 2013; 33:2407-14.
66. Patten I S, Arany Z. PGC-1 coactivators in the cardiovascular system. Trends Endocrinol Metab. 2012; 23:90-97.
67. Sun N, Youle R J, Finkel T. The Mitochondrial Basis of Aging. Mol Cell. 2016; 61:654-66.
68. Ohgushi M, Minaguchi M, Sasai Y. Rho-Signaling-Directed YAP/TAZ Activity Underlies the Long-Term Survival and Expansion of Human Embryonic Stem Cells. Cell Stem Cell. 2015; 17:448-61.
69. Wang L, Luo J Y, Li B, Tian X Y, Chen L J, Huang Y, Liu J, Deng D, Lau C W, Wan S, Ai D, Mak K K, Tong K K, et al. Integrin-YAP/TAZ-JNK cascade mediates atheroprotective effect of unidirectional shear flow. Nature. 2016; 540:579-82.
70. Elbediwy A, Vincent-Mistiaen Z I, Spencer-Dene B, Stone R K, Boeing S, Wculek S K, Cordero J, Tan E H, Ridgway R, Brunton V G, Sahai E, Gerhardt H, Behrens A, et al. Integrin signalling regulates YAP and TAZ to control skin homeostasis. Development. 2016; 143:1674-87.
71. Ames J J, Contois L, Caron J M, Tweedie E, Yang X, Friesel R, Vary C, Brooks P C. Identification of an Endogenously Generated Cryptic Collagen Epitope (XL313) That May Selectively Regulate Angiogenesis by an Integrin Yes-associated Protein (YAP) Mechano-transduction Pathway. J Biol Chem. 2016; 291:2731-50.
72. Merino M M, Levayer R, Moreno E. Survival of the Fittest: Essential Roles of Cell Competition in Development, Aging, and Cancer. Trends Cell Biol. 2016; 26:776-88.
73. Marsh E, Gonzalez D G, Lathrop E A, Boucher J, Greco V. Positional Stability and Membrane Occupancy Define Skin Fibroblast Homeostasis In Vivo. Cell. 2018; 175: 1620-1633. e1613.
74. Stevens T, Phan S, Frid M G, Alvarez D, Herzog E, Stenmark K R. Lung vascular cell heterogeneity: endothelium, smooth muscle, and fibroblasts. Proc Am Thorac Soc. 2008; 5:783-91.
75. Zhao B, Wei X, Li W, Udan R S, Yang Q, Kim J, Xie J, Ikenoue T, Yu J, Li L, Zheng P, Ye K, Chinnaiyan A, et al. Inactivation of YAP oncoprotein by the Hippo pathway is involved in cell contact inhibition and tissue growth control. Genes Dev. 2007; 21:2747-61.
76. Shao D D, Xue W, Krall E B, Bhutkar A, Piccioni F, Wang X, Schinzel A C, Sood S, Rosenbluh J, Kim J W, Zwang Y, Roberts T M, Root D E, et al. KRAS and YAP1 converge to regulate EMT and tumor survival. Cell. 2014; 158:171-84.
77. Haynes B A, Huyck R W, James A J, Carter M E, Gaafar O U, Day M, Pinto A, Dobrian A D. Isolation, Expansion, and Adipogenic Induction of CD34+CD31+Endothelial Cells from Human Omental and Subcutaneous Adipose Tissue. J Vis Exp. 2018; 137.

We claim:

1. A method of stimulating angiogenesis in a subject in need thereof comprising the step of: administering to the subject a therapeutically effective amount of ML141, whereby angiogenesis in the subject is stimulated, wherein the therapeutically effective amount of ML141 is administered as a composition having a ML 141 concentration of 0.1 µM to less than 15 µM.

2. The method of claim 1, wherein the ML141 is administered by subcutaneous, intravenous, or intraperitoneal injection.

3. The method of claim 1, wherein ML141 is administered in a gel.

4. The method of claim 1, wherein prior to administration of ML 141 or the derivative thereof, the area of endothelial cells of the subject are at least 1.5 times larger than the area of endothelial cells from a subject less than 50 years of age.

5. The method of claim 4, wherein endothelial cell size is measured by a method comprising the steps of:
obtaining an adipose tissue sample from the subject;
staining the adipose tissue with a stain specific for endothelial cells; and
measuring the area of the stained endothelial cells.

6. The method of claim 5, wherein the stain silver nitrate.

7. The method of claim 1, wherein prior to administration of ML141, the endothelial cells of the subject are at least 25% less dense than endothelial cells from a subject less than 50 years of age.

8. The method of claim 7, wherein endothelial cell density is measured by a method comprising the steps of:
obtaining an adipose tissue sample from the subject;
staining the adipose tissue with a stain specific for endothelial cells; and
measuring the density of the stained endothelial cells.

9. The method of claim 8, wherein the stain is silver nitrate.

10. The method of claim 1, wherein the ML141 is administered as part of a pharmaceutical composition additionally comprising a carrier.

11. The method of claim 1, wherein the subject has previously been diagnosed with cardiovascular disease, Alzheimer's, osteoporosis, diabetes, age-related macular degeneration, or chronic obstructive pulmonary disease.

12. A method of stimulating angiogenesis in a subject comprising: obtaining an adipose tissue sample from the subject; staining the adipose tissue with a stain specific for endothelial cells; measuring the area of the stained endothelial cells; and administering to the subject a therapeutically effective amount of ML141 when the area of the endothelial cells is at least 1.5 times larger than the area of endothelial cells from a subject less than 50 years of age, whereby angiogenesis is stimulated, wherein the therapeutically effective amount of ML141 is administered as a composition having a ML 141 concentration of 0.1 µM to less than 15 µM.

13. The method of claim 12, wherein the stain is silver nitrate.

14. The method of claim 12, wherein the ML141 is administered by subcutaneous, intravenous, or intraperitoneal injection.

15. The method of claim 12, wherein the ML141 is administered with a population of endothelial cells.

16. The method of claim 12, wherein the ML141 is administered as part of a pharmaceutical composition additionally comprising a carrier.

17. The method of claim 16, wherein the carrier is a gel.

18. The method of claim 12, wherein the subject has previously been diagnosed with cardiovascular disease, Alzheimer's, osteoporosis, diabetes, age-related macular degeneration, or chronic obstructive pulmonary disease.

* * * * *

UNITED STATES PATENT AND TRADEMARK OFFICE
CERTIFICATE OF CORRECTION

PATENT NO. : 12,433,871 B2
APPLICATION NO. : 17/439382
DATED : October 7, 2025
INVENTOR(S) : Akiko Mammoto et al.

It is certified that error appears in the above-identified patent and that said Letters Patent is hereby corrected as shown below:

In the Specification

Column 3, Line 7, "20 Graph" should be --20 μm. Graph--.

Column 3, Line 50, "10 Graphs" should be --10 μm. Graph--.

Column 4, Line 17, "bar, Graphs" should be --bar, 10 μm. Graph--.

Column 4, Line 26, "10 Graphs" should be --10 μm. Graph--.

Column 4, Line 34, "20 Graphs" should be --20 μm. Graph--.

Column 4, Line 42, "10 Graphs" should be --10 μm. Graph--.

Column 4, Line 48, "20 Graphs" should be --20 μm. Graph--.

Column 4, Line 55, "20 Graphs" should be --20 μm. Graph--.

Column 4, Line 63, "20 Graphs" should be --20 μm. Graph--.

Column 4, Line 65, "20 Graphs" should be --20 μm. Graph--.

Column 5, Line 16, "20 Graph" should be --20 μm. Graph--.

Column 5, Line 22, "10 (FIG." should be --10 μm. (FIG.--.

Column 21, Line 40, "(32" should be --β2--.

Signed and Sealed this
Thirteenth Day of January, 2026

John A. Squires
*Director of the United States Patent and Trademark Office*

CERTIFICATE OF CORRECTION (continued)
U.S. Pat. No. 12,433,871 B2

Column 23, Line 18, "Mostoslaysky" should be --Mostoslavsky--.

Column 24, Line 17, "Pel M" should be --Pešl M--.

Column 26, Line 4, "(31" should be --$\beta$1--.

Column 26, Line 35, "f3" should be --$\beta$--.